United States Patent
Jung et al.

(10) Patent No.: US 12,101,670 B2
(45) Date of Patent: Sep. 24, 2024

(54) METHOD AND APPARATUS FOR RESELECTING CELL IN WIRELESS COMMUNICATION SYSTEM

(71) Applicant: SAMSUNG ELECTRONICS CO., LTD., Suwon-si (KR)

(72) Inventors: Sangyeob Jung, Suwon-si (KR); Soenghun Kim, Suwon-si (KR); Himke Van Der Velde, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 29 days.

(21) Appl. No.: 18/052,825

(22) Filed: Nov. 4, 2022

(65) Prior Publication Data

US 2023/0087912 A1    Mar. 23, 2023

Related U.S. Application Data

(63) Continuation of application No. 17/118,437, filed on Dec. 10, 2020, now Pat. No. 11,496,931.

(30) Foreign Application Priority Data

Dec. 10, 2019    (KR) ........................ 10-2019-0163978

(51) Int. Cl.
    *H04W 36/00*        (2009.01)
    *H04W 36/04*        (2009.01)
                (Continued)

(52) U.S. Cl.
    CPC ....... *H04W 36/0055* (2013.01); *H04W 36/04* (2013.01); *H04W 36/08* (2013.01);
                (Continued)

(58) Field of Classification Search
    CPC . H04W 36/0055; H04W 36/04; H04W 36/08; H04W 36/36; H04W 76/27;
                (Continued)

(56) References Cited

U.S. PATENT DOCUMENTS

| 2010/0273485 A1 | 10/2010 | Huang et al. |
| 2011/0216732 A1 | 9/2011 | Maeda et al. |

(Continued)

FOREIGN PATENT DOCUMENTS

| CN | 101754384 A | 6/2010 |
| CN | 102138354 A | 7/2011 |

(Continued)

OTHER PUBLICATIONS

European Patent Office, "Supplementary European Search Report," dated Dec. 2, 2022, in connection with European Patent Application No. 20900396.1, 14 pages.

(Continued)

*Primary Examiner* — Ankur Jain

(57) ABSTRACT

A method, performed by a terminal in a wireless communication system, includes: transmitting, to a first cell, capability information of the terminal including information on whether the terminal supports plurality of cell reselection priorities (CRPs); receiving, from the first EUTRAN cell, a radio resource control (RRC) Connection Release message including an alternativeCRPindication parameter indicating to apply CRP broadcast in system information, based on the capability information of the terminal; transitioning to an RRC idle mode or an RRC inactive mode based on the RRC Connection Release message, and camping on a second cell; receiving, from the second cell, system information; and determining, based on the system information, whether to apply a first CRP for an inter-RAT frequency or a second CRP for at least one EUTRAN frequency.

20 Claims, 12 Drawing Sheets

(51) Int. Cl.
  *H04W 36/08* (2009.01)
  *H04W 36/36* (2009.01)
  *H04W 76/27* (2018.01)
  *H04W 76/30* (2018.01)
(52) U.S. Cl.
  CPC ........... *H04W 36/36* (2013.01); *H04W 76/27* (2018.02); *H04W 76/30* (2018.02)
(58) Field of Classification Search
  CPC ..... H04W 76/30; H04W 48/20; H04W 76/38; H04W 36/0061
  See application file for complete search history.

(56) References Cited

U.S. PATENT DOCUMENTS

| | | | |
|---|---|---|---|
| 2013/0189987 A1* | 7/2013 | Klingenbrunn | H04W 36/165 455/436 |
| 2014/0198640 A1* | 7/2014 | Suzuki | H04W 48/18 370/230 |
| 2014/0287753 A1 | 9/2014 | Schulist et al. | |
| 2015/0043533 A1* | 2/2015 | Kim | H04W 36/0007 370/331 |
| 2015/0312826 A1* | 10/2015 | Yiu | H04W 48/16 455/437 |
| 2017/0156091 A1 | 6/2017 | Wang et al. | |
| 2018/0352480 A1* | 12/2018 | Dong | H04W 76/40 |
| 2019/0045576 A1* | 2/2019 | Jung | H04W 76/27 |
| 2019/0373523 A1* | 12/2019 | Panchal | H04L 5/0032 |
| 2020/0022095 A1* | 1/2020 | Kim | H04W 72/56 |
| 2020/0280895 A1 | 9/2020 | Jung et al. | |
| 2021/0176674 A1* | 6/2021 | Jung | H04W 36/36 |
| 2021/0282064 A1* | 9/2021 | Wang | H04W 36/324 |

FOREIGN PATENT DOCUMENTS

| | | |
|---|---|---|
| CN | 104756556 A | 7/2015 |
| CN | 105144787 A | 12/2015 |
| EP | 3337234 A1 | 6/2018 |
| KR | 10-2020-0129565 A | 11/2020 |
| WO | 2014021611 A1 | 2/2014 |
| WO | 2014056675 A2 | 4/2014 |
| WO | 2014182209 A1 | 11/2014 |
| WO | 2015139666 A1 | 9/2015 |
| WO | 2019059673 A1 | 3/2019 |

OTHER PUBLICATIONS

Qualcomm Incorporated, "Enhancement to Dedicated Priority Signaling", 3GPP TSG RAN WG2 Meeting #92, Anaheim, USA, Nov. 16-20, 2015, R2-156794, 2 pages.
Notification of Transmittal of the International Search Report and the Written Opinion of the International Searching Authority, or the Declaration dated Mar. 2, 2021 in connection with International Patent Application No. PCT/KR2020/018096, 9 pages.
Office Action issued May 20, 2024, in connection with Chinese Patent Application No. 202080085899.5, 11 pages.
Ericsson, "Cell-specific prioritisation at reselection," 3GPP TSG-RAN WG2 #99-bis on NR Tdoc, R2-1710452, Prague, Czech, Oct. 2017, 6 pages.

* cited by examiner

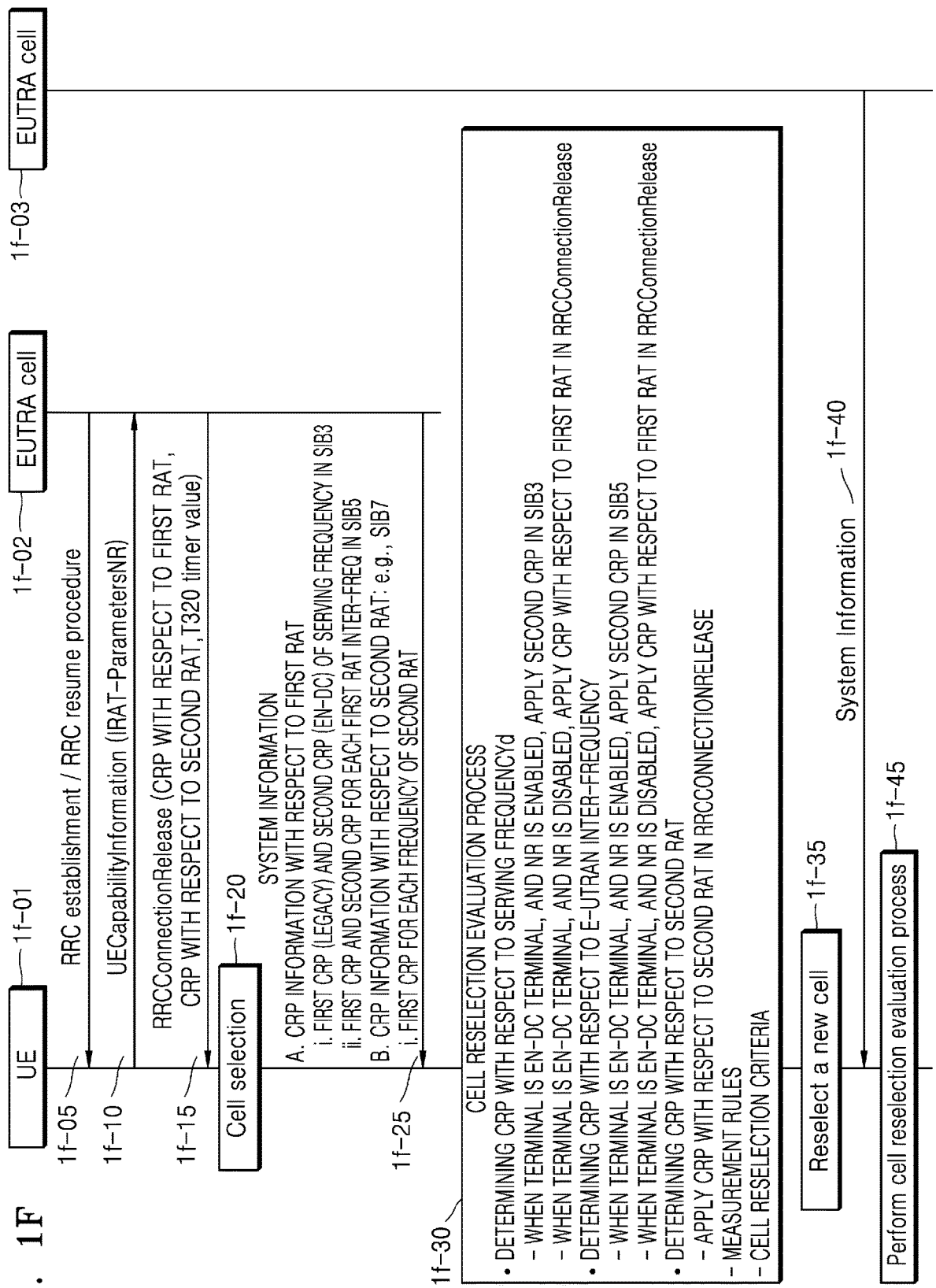

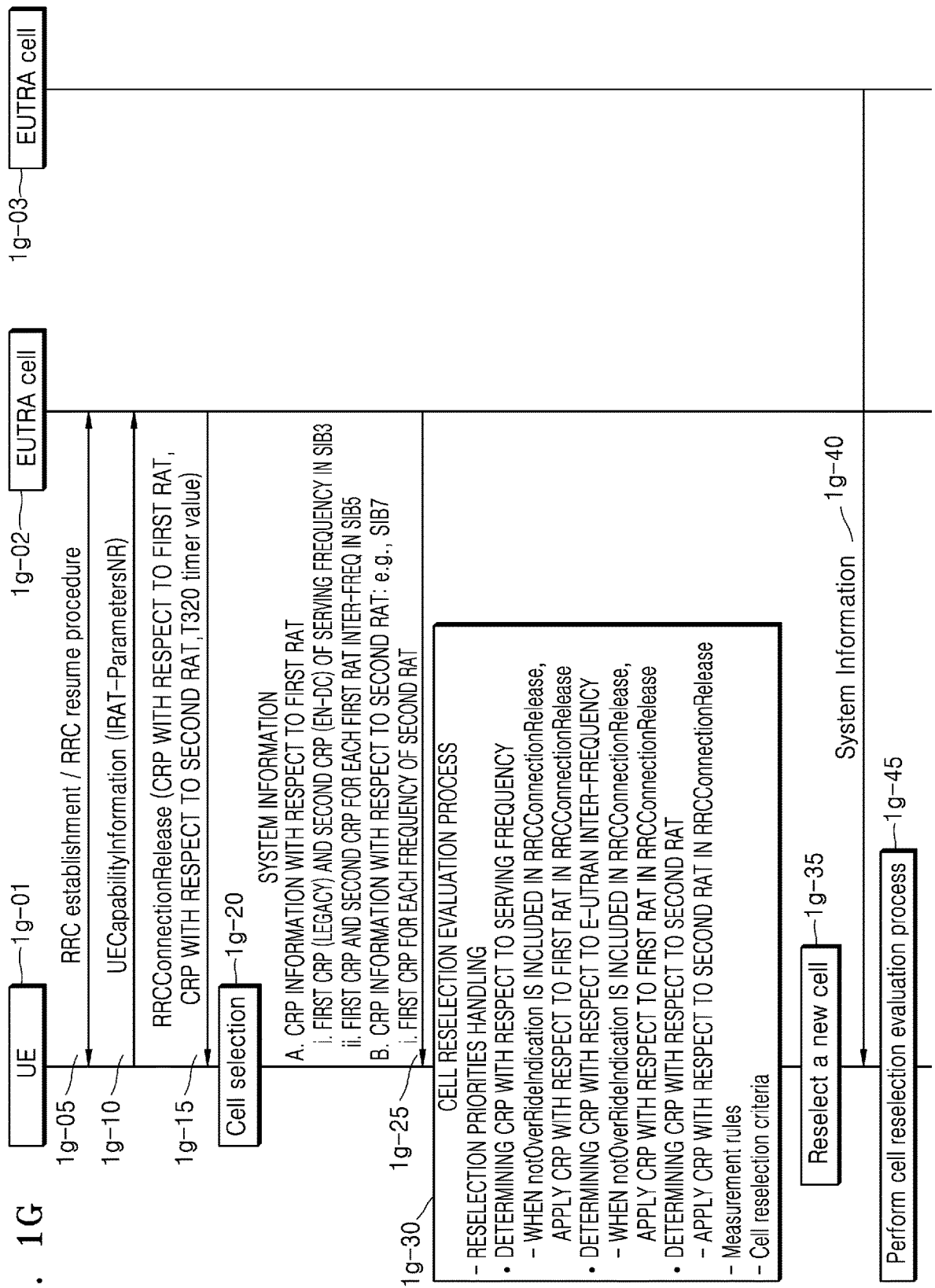

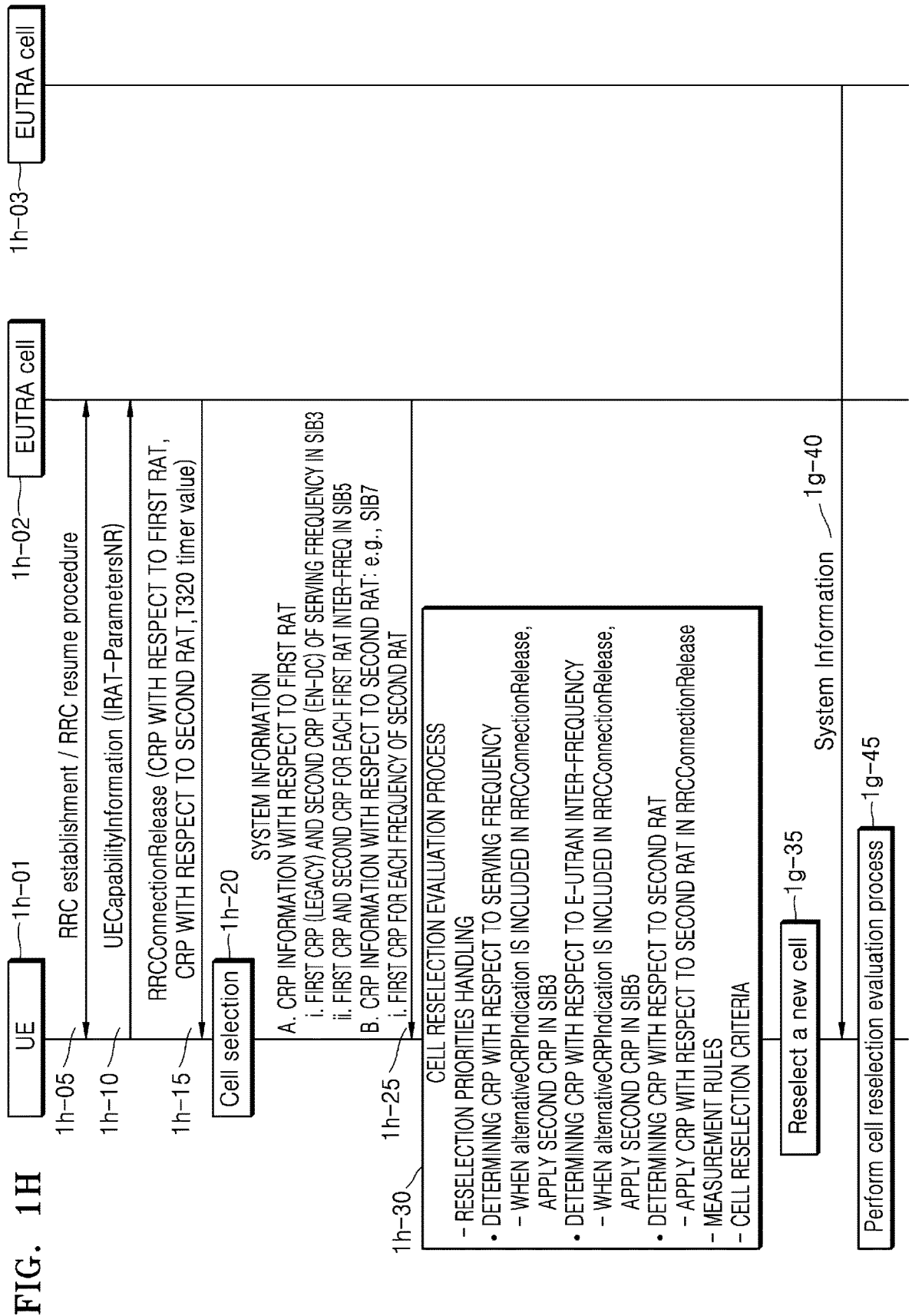

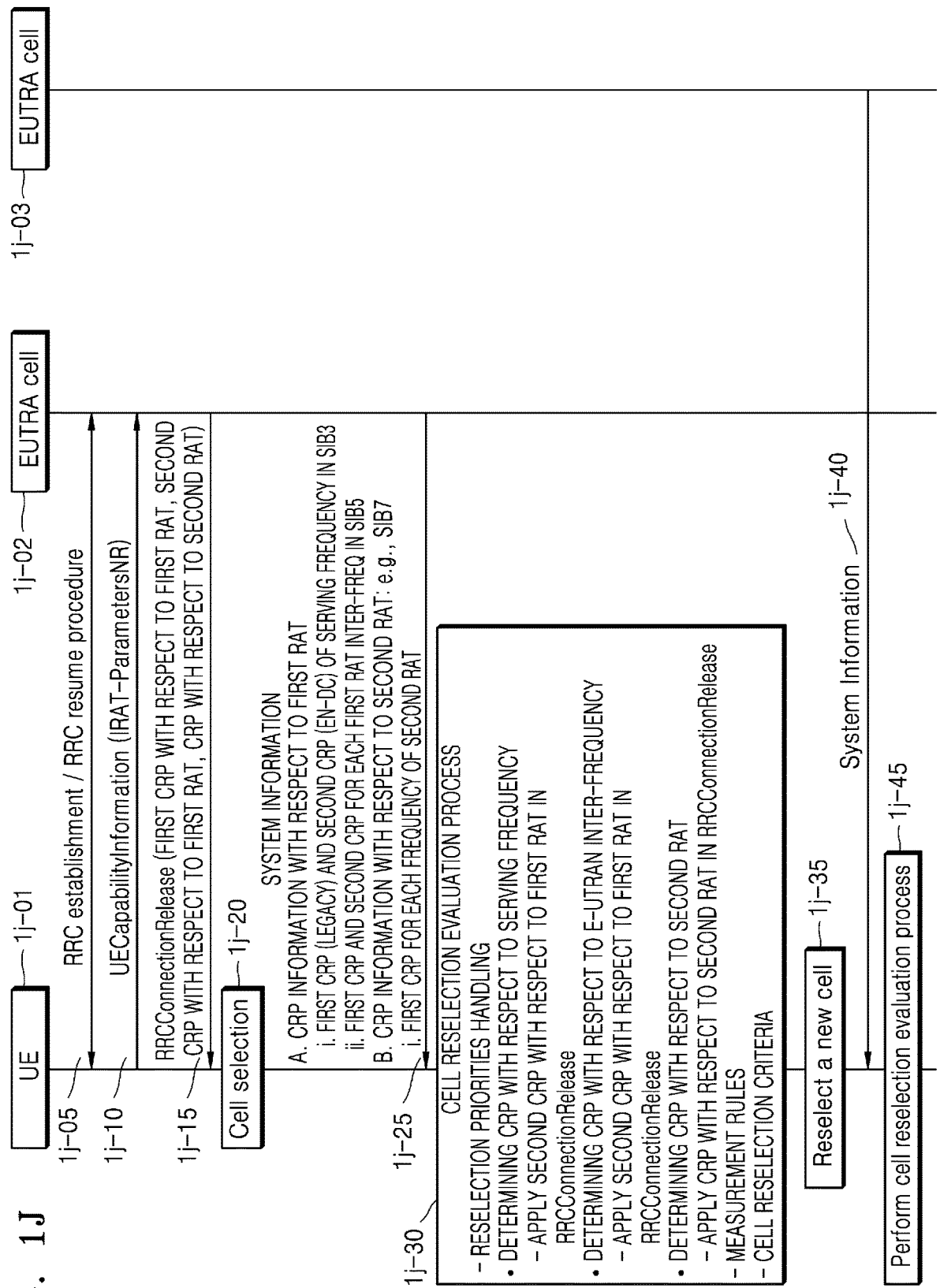

METHOD AND APPARATUS FOR RESELECTING CELL IN WIRELESS COMMUNICATION SYSTEM

CROSS-REFERENCE TO RELATED APPLICATIONS

This application is a continuation application Ser. No. 17/118,437, now U.S. Pat. No. 11,496,931 issued on Nov. 8, 2022, which is based on and claims priority under 35 U.S.C. § 119 to Korean Patent Application No. 10-2019-0163978 filed on Dec. 10, 2019, in the Korean Intellectual Property Office, the disclosures of which are incorporated by reference herein in their entirety.

BACKGROUND

1. Field

The disclosure relates to a method and apparatus for reselecting a cell in a wireless communication system.

2. Description of Related Art

To meet the increase in demand with respect to wireless data traffic after the commercialization of $4^{th}$ generation (4G) communication systems, considerable efforts have been made to develop pre-$5^{th}$ generation (5G) communication systems or 5G communication systems. This is one reason why '5G communication systems' or 'pre-5G communication systems' are called 'beyond 4G network communication systems' or 'post Long-Term Evolution (LTE) systems.' In order to achieve a high data rate, 5G communication systems are being developed to be implemented in a super-high frequency band (millimeter wave (mm Wave)), e.g., a band of 60 GHz. In order to reduce the path loss of radio waves in such a super-high frequency band and to increase a transmission distance of radio waves in 5G communication systems, various technologies have been discussed and are being studied, for example: beamforming, massive multiple-input multiple-output (massive MIMO), full dimensional MIMO (FD-MIMO), array antennas, analog beamforming, and large-scale antennas. In order to improve system networks for 5G communication systems, various technologies have been developed, e.g., evolved small cells, advanced small cells, cloud radio access networks (Cloud-RAN), ultra-dense networks, device-to-device (D2D) communication, wireless backhaul, moving networks, cooperative communication, coordinated multi-points (CoMP), and interference cancellation. Also, for 5G communication systems, other technologies have been developed, e.g., hybrid frequency-shift keying (FSK) and quadrature amplitude modulation (QAM) (FQAM) and sliding window superposition coding (SWSC), which are advanced coding modulation (ACM) schemes, and filter bank multi carrier (FBMC), non-orthogonal multiple access (NOMA), and sparse code multiple access (SCMA), which are advanced access schemes.

The Internet has evolved from a human-based connection network, where humans create and consume information, to the Internet of things (IoT), where distributed components, such as objects, exchange information with each other to process the information. Internet of Everything (IoE) technology is emerging, in which technology related to the IoT is combined with, for example, technology for processing big data through connection with a cloud server. In order to implement the IoT, various technological components are required, such as sensing technology, wired/wireless communication and network infrastructures, service interface technology, security technology, etc. In recent years, technologies including a sensor network for connecting objects, machine to machine (M2M) communication, machine type communication (MTC), etc. have been studied. In the IoT environment, intelligent Internet, technology (IT) services may be provided to collect and analyze data obtained from objects connected to each other to create new value in human life. As existing information technology (IT) techniques and various industries converge and combine with each other, the IoT may be applied to various fields, such as smart homes, smart buildings, smart cities, smart cars or connected cars, smart grids, health care, smart home appliances, high-quality medical services, etc.

Various attempts are being made to apply 5G communication systems to the IoT network. For example, technologies related to sensor networks, communication, MTC, etc. are being implemented by using 5G communication technology including beam-forming, MIMO, array antennas, etc. The application of Cloud-RAN as a big data processing technology described above may be an example of convergence of 5G communication technology and IoT technology.

As described above, various services may be provided due to the development of wireless communication systems, and thus, there is a need for methods of easily providing such services.

SUMMARY

Provided are an apparatus and method for effectively providing services in a wireless communication system.

Additional aspects will be set forth in part in the description which follows and, in part, will be apparent from the description, or may be learned by practice of the presented embodiments of the disclosure.

According to an embodiment of the disclosure, a method, performed by a terminal in a wireless communication system, includes: transmitting, to a first Evolved Universal Mobile Telecommunications System (UMTS) Terrestrial Radio Access Network (EUTRAN) cell, capability information of the terminal including information on whether the terminal supports plurality of cell reselection priorities (CRPs); receiving, from the first EUTRAN cell, a radio resource control (RRC) Connection Release message including an alternativeCRPindication parameter indicating to apply CRP broadcast in system information, based on the capability information of the terminal; transitioning to an RRC idle mode or an RRC inactive mode based on the RRC Connection Release message, and camping on a second EUTRAN receiving, from the second EUTRAN cell, system information; and determining, based on the system information, whether to apply a first CRP for an inter-RAT frequency or a second CRP for the EUTRAN frequency.

The method may further include, in case that the RRC Connection Release message includes a value of a timer, starting the timer based on the value of the timer.

The system information may be included in system information block (SIB)3, or SIB5.

The SIB3 may include information on the second CRP of a serving frequency associated with the second EUTRAN cell, and the second CRP of the serving frequency may be determined based on at least one of a value of cellReselectionPriority or a value of cellReselectionSubpriority.

The SIB5 may include information on the second CRP of a EUTRAN inter frequency.

According to an embodiment of the disclosure, a terminal in a wireless communication system includes: a transceiver; and at least one processor connected with the transceiver and configured to: transmit, to a first Evolved Universal Mobile Telecommunications System (UMTS) Terrestrial Radio Access Network (EUTRAN) cell, capability information of the terminal including information on whether the terminal supports plurality of cell reselection priorities (CRPs), receive, from the first EUTRAN cell, a radio resource control (RRC) Connection Release message including an alternativeCRPindication parameter indicating to apply CRP broadcast in system information, based on the capability information of the terminal, transition to an RRC idle mode or an RRC inactive mode based on the RRC Connection Release message, and camping on a second EUTRAN cell, receive, from the second EUTRAN cell, system information, and determine, based on the system information, whether to apply a first CRP for an inter-RAT frequency or a second CRP for the EUTRAN frequency.

The at least one processor may be further configured start a timer in case that the RRC Connection Release message includes a value of a timer.

The system information may be included in system information block (SIB)3, or SIB5.

The SIB3 may include information on the second CRP of a serving frequency associated with the second OUTRAN cell, and the second CRP of the serving frequency may be determined based on at least one of a value of cellReselectionPriority or a value of cellReselectionSubpriority.

The SIB5 may include information on the second CRP of EUTRAN inter frequency.

According to an embodiment of the disclosure, a method, performed by a base station associated with a first Evolved Universal Mobile Telecommunications System (UMTS) Terrestrial Radio Access Network (EUTRAN) cell in a wireless communication system, includes: receiving, from a terminal, capability information of the terminal including information on whether the terminal supports plurality of cell reselection priorities (CRPs); and transmitting, to the terminal, a radio resource control (RRC) Connection Release message including an alternativeCRPindication parameter indicating to apply CRP broadcast in system information, based on the capability information of the terminal; and wherein the terminal is transitioned to an RRC idle mode or an RRC inactive mode based on the RRC Connection Release message, camps on a second EUTRAN cell, receives, from the second EUTRAN cell, system information, and determines, based on the system information, whether to apply a first CRP for an inter-RAT frequency or a second CRP for the EUTRAN frequency.

In case that the RRC Connection Release message includes a value of a timer, the terminal may start the timer based on the value of the timer.

The system information may be included in system information block (SIB)3, or SIB5.

The SIB3 may include information on the second CRP of a serving frequency associated with the second EUTRAN cell, and the second CRP of the serving frequency is determined based on at least one of a value of cellReselectionPriority or a value of cellReselectionSubpriority.

The SIB5 may include information on the second CRP of EUTRAN inter frequency.

According to an embodiment of the disclosure, a base station associated with a first Evolved Universal Mobile Telecommunications System (UMTS) Terrestrial Radio Access Network (EUTRAN) cell in a wireless communication system, includes: a transceiver; and at least one processor connected with the transceiver and configured to: receive, from a terminal, capability information of the terminal including information on whether the terminal supports plurality of cell reselection priorities (CRPs), and transmit, to the terminal, a radio resource control (RRC) Connection Release message including an alternative-CRPindication parameter indicating to apply CRP broadcast in system information, based on the capability information of the terminal, wherein the terminal is transitioned to an RRC idle mode or an RRC inactive mode based on the RRC Connection Release message, camps on a second EUTRAN cell, receives, from the second EUTRAN cell, system information, and determines, based on the system information, whether to apply a first CRP for an inter-RAT frequency or a second CRP for the EUTRAN frequency.

In case that the RRC Connection Release message includes a value of a timer, the terminal may start the timer based on the value of the timer.

The system information may be included in system information block (SIB)3, or SIB5.

The SIB3 may include information on the second CRP of a serving frequency associated with the second EUTRAN cell, and the second CRP of the serving frequency is determined based on at least one of a value of cellReselectionPriority or a value of cellReselectionSubpriority.

The SIB5 may include information on the second CRP of EUTRAN inter frequency.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 1F is a diagram for describing a process of reselecting a cell, performed by a terminal that is in an RRC inactive mode RRC_INACTIVE or an RRC idle mode RRC_IDLE in a next-generation mobile communication system, according to an embodiment of the disclosure;

FIG. 1G is a diagram for describing a process of reselecting a cell, performed by a terminal that is in an RRC inactive mode RRC_INACTIVE or an RRC idle mode RRC_IDLE in a next-generation mobile communication system, according to an embodiment of the disclosure;

FIG. 1H is a diagram for describing a process of reselecting a cell, performed by a terminal that is in an RRC inactive mode RRC_INACTIVE or an RRC idle mode RRC_IDLE in a next-generation mobile communication system, according to an embodiment of the disclosure;

FIG. 1J is a diagram for describing a process of reselecting a cell, performed by a terminal that is in an RRC inactive mode RRC_INACTIVE or an RRC idle mode RRC_IDLE in a next-generation mobile system, according to an embodiment of the disclosure;

DETAILED DESCRIPTION

Figure 1A:
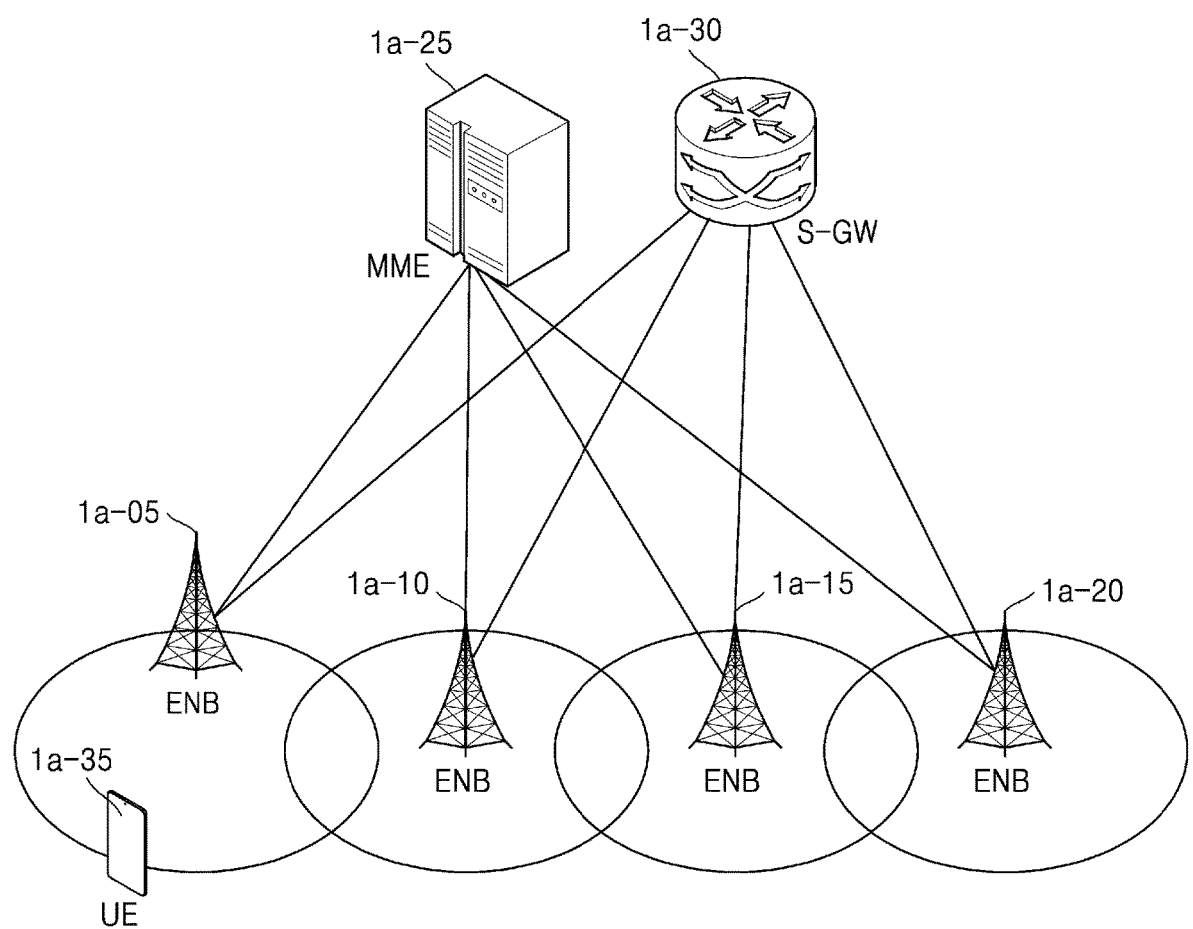
FIG. 1A is a diagram illustrating a structure of a Long Term Evolution (LTE) system according to an embodiment of the disclosure.

FIGS. 1A through 1L, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to accompanying drawings. While describing the disclosure, detailed description of related well-known functions or configurations may be omitted when it is deemed that they may unnecessarily obscure the essence of the disclosure. Also, terms used below are defined in consideration of functions in the disclosure, and may have different meanings according to an intention of a user or operator, customs, or the like. Thus, the terms should be defined based on the description throughout the specification.

The advantages and features of the disclosure and methods of achieving the advantages and features will become apparent with reference to embodiments of the disclosure described in detail below with reference to the accompanying drawings. The disclosure may, however, be embodied in many different forms and should not be construed as being limited to the embodiments of the disclosure set forth herein; rather, these embodiments of the disclosure are provided so that this disclosure will be thorough and complete, and will fully convey the concept of the disclosure to those skilled in the art. The scope of the disclosure is only defined in the claims. Throughout the specification, like reference numerals or characters refer to like elements.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

It will be understood that each block of flowchart illustrations and combinations of blocks in the flowchart illustrations may be implemented by computer program instructions. These computer program instructions may be provided to a processor of a general-purpose computer, special purpose computer, or other programmable data processing equipment, such that the instructions, which are executed via the processor of the computer or other programmable data processing equipment, generate means for performing functions specified in the flowchart block(s). These computer program instructions may also be stored in a computer-usable or computer-readable memory that may direct a computer or other programmable data processing equipment to function in a particular manner, such that the instructions stored in the computer-usable or computer-readable memory produce a manufactured article including instruction means that perform the functions specified in the flowchart block(s). The computer program instructions may also be loaded onto a computer or other programmable data processing equipment to cause a series of operational steps to be performed on the computer or other programmable data processing equipment to produce a computer-executable process such that the instructions that are executed on the computer or other programmable data processing equipment provide steps for implementing the functions specified in the flowchart block or blocks.

In addition, each block may represent a module, segment, or portion of code, which includes one or more executable instructions for implementing specified logical function(s). It should also be noted that in some alternative implementations, the functions noted in the blocks may occur out of the presented order. For example, two blocks shown in succession may in fact be executed substantially concurrently or the blocks may sometimes be executed in the reverse order, according to the functionality involved.

The term "unit" or '~er (or)' used herein denotes a software element or a hardware element such as a field-programmable gate array (FPGA) or an application-specific integrated circuit (ASIC), and performs a certain function. However, the term 'unit' or '~er (or)' is not limited to software or hardware. The term 'unit' or '~er (or)' may be configured to be included in an addressable storage medium or to reproduce one or more processors. Thus, the term 'unit' or '~er (or)' may include, by way of example, object-oriented software components, class components, and task components, and processes, functions, attributes, procedures, subroutines, segments of a program code, drivers, firmware, a micro code, a circuit, data, a database, data structures, tables, arrays, and variables. Functions provided by components and 'units' or '~ers (ors)' may be combined into a smaller number of components and 'units' or '~ers (ors)' or may be further separated into additional components and 'units' or '~ers (ors)'. In addition, the components and 'units' or '~ers (ors)' may be implemented to operate one or more central processing units (CPUs) in a device or a secure multimedia card. Also, 'units' or '~ers (ors)' may include at least one processor.

While describing the disclosure, detailed description of related well-known functions or configurations may be omitted when it is deemed that they may unnecessarily obscure the essence of the disclosure. Hereinafter, embodiments of the disclosure will be described with reference to accompanying drawings.

In the following description, the term for identifying an access node, the term referring to a network entity, the term referring to messages, the term referring to an interface between network objects, and the term referring to various identification information, and the like are examples provided for convenience of description. However, the disclosure is not limited by the following terms, and other terms having equivalent technical meanings may be used.

Hereinafter, for convenience of description, in the disclosure, the terms and names defined in the 3rd Generation Partnership Project Long Term Evolution (3GPP LTE) specification are used. However, the disclosure is not limited by the terms and names, but may also be applied to systems complying with other specifications. In particular, the disclosure may be applied to a 3GPP New Radio (NR, 5th Generation mobile communication standards). In the disclosure, 'eNB' may be interchangeably used with 'gNB' for convenience of description. That is, a base station described as an 'eNB' may denote a 'gNB'. Also, the term 'terminal' may indicate not only mobile phones, NarrowBand-Internet of Things (NB-IoT) devices, or sensors but also other wireless communication devices.

Hereinafter, a base station is an entity that assigns resources of a terminal, and may be at least one of a gNode B, an eNode B, Node B, a base station (BS), a radio access unit, a base station controller, or a node on a network. Examples of a terminal may include a user equipment (UE), a mobile station (MS), a cellular phone, a smartphone, a computer, a multimedia system capable of performing a communication function, or the like. However, the terminal is not limited to the above examples.

FIG. 1A is a diagram illustrating a structure of an LTE system according to an embodiment of the disclosure.

Referring to FIG. 1A, a radio access network of the LTE system may consist of next-generation base stations (Evolved Node B (hereinafter, 'ENB', a 'Node B,' or a 'base station')) 1a-05, 1a-10, 1a-15, and 1a-20, a mobility management entity (MME) 1a-25, and a Serving-Gateway (S-GW) 1a-30. A user equipment (hereinafter 'UE' or 'terminal') 1a-35 may access an external network via the ENBs 1a-05 through 1a-20 and the S-GW 1a-30.

In FIG. 1A, the ENBs 1a-05 through 1a-20 may correspond to an existing Node B of the Universal Mobile Telecommunication System (UMTS). An ENB may be connected to the UE 1a-35 via a wireless channel and may perform a more complicated function than that of the existing Node B. In the LTE system, all user traffic including a real-time service such as a Voice over Internet protocol (VoIP) may be serviced through a shared channel. Accordingly, an apparatus that collects status information such as a buffer state, an available transmission power state, a channel state, or the like of UEs, and schedules the status information is necessary, and the ENBs 1a-05 through 1a-20 may assume this function.

One ENB may typically control multiple cells. For example, in an LTE system, to realize a transmission rate of 100 Mbps, Orthogonal Frequency Division Multiplexing (OFDM) may be used at a bandwidth of, for example, 20 MHz, as a radio access technology (RAT). In addition, an Adaptive Modulation & Coding (AMC) scheme that determines a modulation scheme and a channel coding rate according to a channel status of a terminal may be applied. The S-GW 1a-30 is a device providing a data bearer, and may generate or remove a data bearer according to the control by the MME 1a-25. An MME is a device that assumes not only a mobility management function regarding a terminal but also various control functions, and may be connected to a plurality of base stations.

Figure 1B:
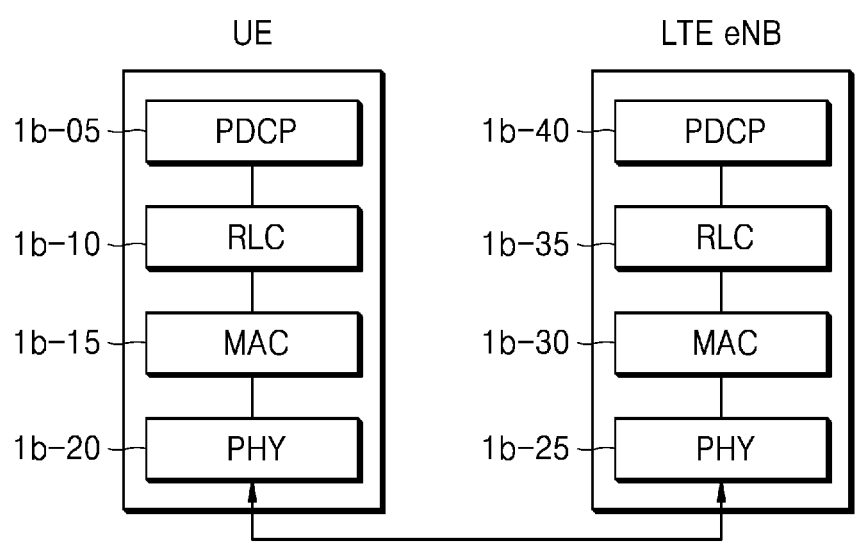
FIG. 1B is a diagram illustrating a wireless protocol structure in an LTE system according to an embodiment of the disclosure.

FIG. 1B is a diagram illustrating a wireless protocol structure in an LTE system according to an embodiment of the disclosure.

Referring to FIG. 1B, in each of a terminal and an ENB, a wireless protocol of the LTE system may consist of a Packet Data Convergence Protocol (PDCP) 1b-05/1b-40, a Radio Link Control (RLC) 1b-10/1b-35, and a Medium Access Control (MAC) 1b-15/1b-30, and a PHY layer 1b-20/b-25. A PDCP may be in charge of operations such as IP header compression/decompression. Major functions of the PDCP may be summarized as below.

Header compression and decompression: Robust Header Compression (ROHC) only

Transfer of user data

In-sequence delivery of upper layer Protocol Data Units (PDUs) at PDCP re-establishment procedure for RLC Acknowledged Mode (AM)

For split bearers in dual connectivity (DC) (only support for RLC AM): PDCP PDU routing for transmission and PDCP PDU reordering for reception Duplicate detection of lower layer service data units (SDUs) at PDCP re-establishment procedure for RLC AM Retransmission of PDCP SDUs at handover and, for split bearers in DC, of PDCP PDUs at PDCP data-recovery procedure, for RLC AM Ciphering and deciphering Timer-based SDU discard in uplink The RLC 1b-10 or 1b-35 may reconfigure a PDCP PDU in an appropriate size and perform an Automatic Repeat Request (ARCS) operation or the like. The major functions of an RLC may be summarized as below.

Transfer of upper layer PDUs

ARQ (Error Correction through ARQ (only for AM data transfer))

Concatenation, segmentation, and reassembly of RLC SDUs (only for Unacknowledged Mode (UM) and AM data transfer)

Re-segmentation of RLC data PDUs (only for AM data transfer)

Reordering of RLC data PDUs (only for UM and AM data transfer)

Duplicate detection (only for UM and AM data transfer)

Protocol error detection (only for AM data transfer)

RLC SDU discard (only for UM and AM data transfer)

RLC re-establishment

The MAC 1b-15 or 1b-30 is connected to several RLC layers configured in one terminal, and may multiplex RLC PDUs to MAC PDUs and de-multiplex RLC PDUs from MAC PDUs. The major functions of a MAC may be summarized as below.

Mapping between logical channels and transport channels

Multiplexing/demultiplexing of MAC SDUs belonging to one or different logical channels into/from transport blocks (TB) delivered to/from the physical layer on transport channels Scheduling information reporting Hybrid ARQ (HARQ) (Error correction through HARQ)

Priority handling between logical channels of one UE

Priority handling between UEs by means of dynamic scheduling

Multimedia Broadcast Multicast Service (MBMS) service identification

Transport format selection

Padding

The physical (PHY) layer 1b-20 or 1b-25 may channel-code and modulate upper layer data into OFDM symbols and transmit the OFDM symbols through a wireless channel, or may demodulate OFDM symbols received through a wireless channel and channel-decode the demodulated OFDM symbols and transfer the channel-decoded OFDM symbols to an upper layer.

Figure 1C:
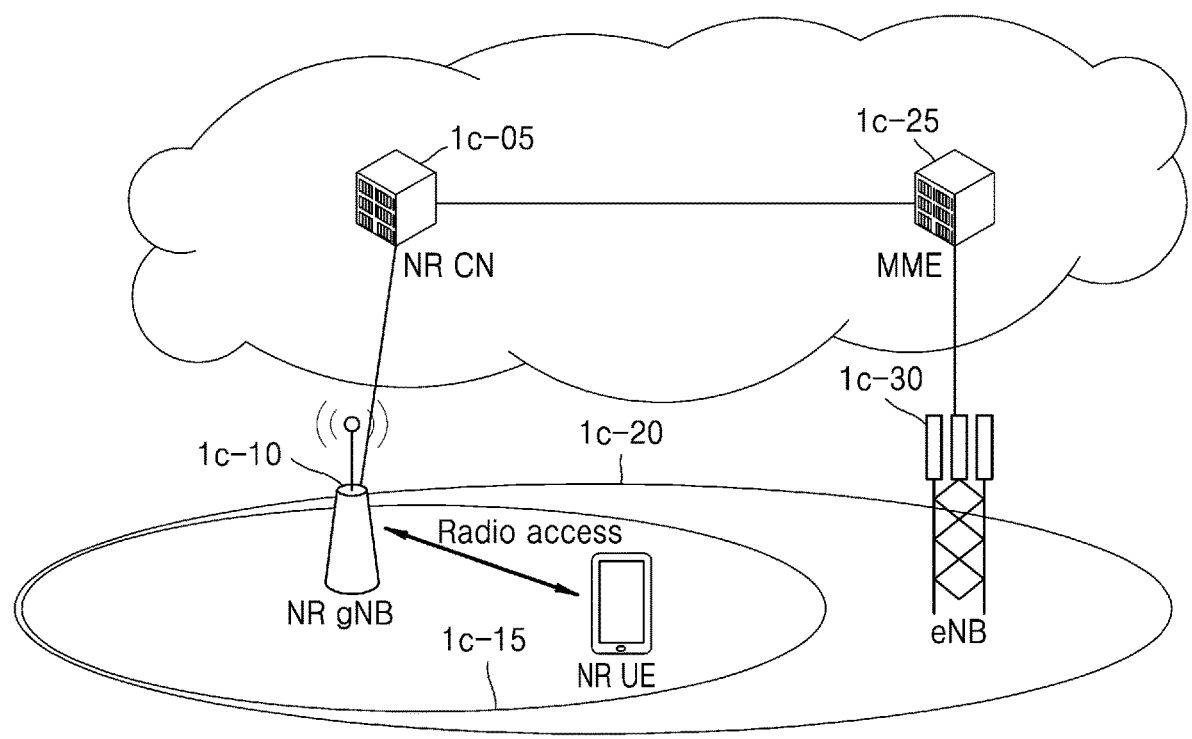
FIG. 1C is a diagram illustrating a structure of a next-generation mobile communication system according to an embodiment of the disclosure.

FIG. 1C is a diagram illustrating a structure of a next-generation mobile communication system according to an embodiment of the disclosure.

Referring to FIG. 1C, a radio access network of a next-generation mobile communication system (hereinafter 'NR' or 5 g) may consist of a next-generation base station (New Radio Node B, hereinafter, 'NR gNB' or 'NR base station') 1c-10 and a New Radio core Network (NR CN) 1c-05. A New Radio user equipment (hereinafter 'NR UE' or 'terminal') 1c-15 may access an external network via the NR gNB 1c-10 and the NR CN 1c-05.

In FIG. 1C, the NR gNB 1c-10 may correspond to an Evolved Node B (eNB) of the existing LTE system. The NR gNB 1c-10 is connected to the NR UE 1c-15 via a wireless channel and may provide far better services than the existing node B. In a next-generation mobile communication system, all user traffic may be serviced through a shared channel. Accordingly, an apparatus that collects status information such as a buffer state, an available transmission power state, a channel state, or the like of UEs, and schedules the status information is necessary, and the NR gNB 1c-10 may assume this function. One NR gNB 1c-10 may control multiple cells. In a next-generation mobile communication system, to realize high-speed data transmission compared to the current LTE, a greater bandwidth than the current maximum bandwidth may be applied. Also, by using OFDM as a RAT, beamforming technology may be additionally linked thereto. In addition, the AMC scheme that determines a modulation scheme and a channel coding rate according to a channel status of a terminal may be applied. The NR CN 1c-05 may perform functions such as mobility support, bearer configuration, or Quality of Service (QoS) configuration. The NR CN 1c-05 is a device that assumes not only a mobility management function regarding a terminal but also various control functions, and may be connected to a plurality of base stations. Also, the next-generation mobile communication system may also be linked to the existing LTE system, and the NR CN 1c-05 may be connected to the MME 1c-25 via a network interface. The MME 1c-25 may be connected to an eNB 1c-30 which is an existing base station.

Figure 1D:
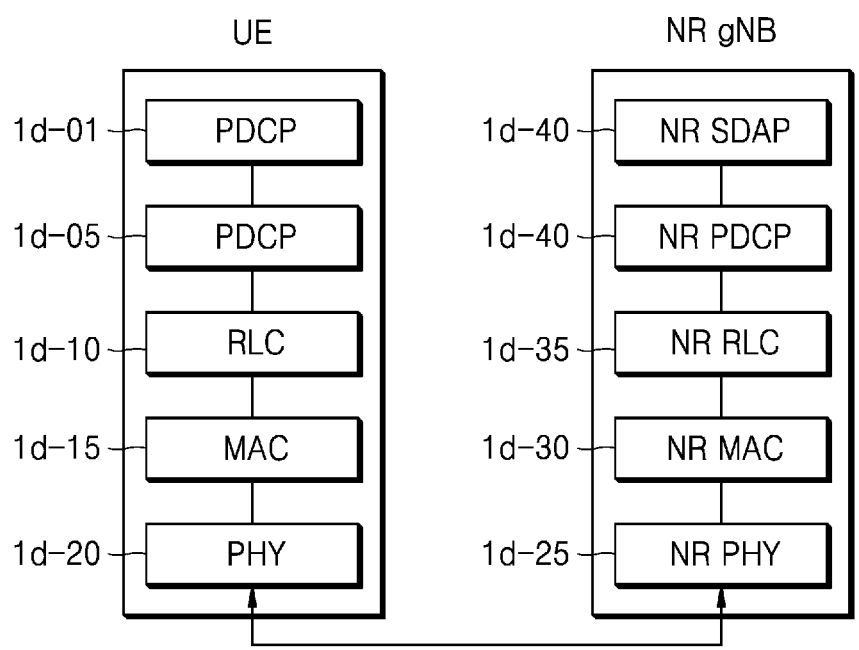
FIG. 1D is a diagram illustrating a wireless protocol structure of a next-generation mobile communication system according to an embodiment of the disclosure.

FIG. 1D is a diagram illustrating a wireless protocol structure of a next-generation mobile communication system according to an embodiment of the disclosure.

Referring to FIG. 1D, in each of a terminal and an NR base station, a wireless protocol of the next-generation mobile communication system consists of an NR service data adaptation protocol (SDAP) 1d-01/1d-45, an NR PDCP 1d-05/1d-40, an NR RLC 1d-10/1d-35, an NR MAC 1d-15/1d-30, and an NR PHY layer 1d-20/1d-25.

The major functions of the NR SDAP 1d-01 or 1d-45 may include some of functions below.

Transfer of user plane data mapping between a QoS flow and a data radio bearer (DRB) for both downlink (DL) and uplink (UL)

marking QoS flow ID in both DL and UL packets mapping reflective QoS flow to DRB for UL SDAP PDUs With respect to an SDAP layer, a terminal may be configured, via a radio resource control (RRC) message, as to whether a header of the SDAP layer is to be used or a function of the SDAP layer is to be used for each PDCP layer or each bearer or each logical channel. When an SDAP header is configured, the terminal may direct to update or re-configure mapping information with respect to QoS flow and a data bearer of an UL and a DL by using a Non-Access Stratum (NAS) reflective QoS configuration 1 bit indicator and an Access Stratum (AS) reflective QoS 1 bit indicator. The SDAP header may include QoS flow ID information indicating a QoS. QoS information may be used as a data processing priority, scheduling information, or the like, to support proper provision of services.

The major functions of the NR PDCP 1d-05 or 1d-40 may include some of functions below.

Header compression and decompression: ROHC only

Transfer of user data

In-sequence delivery of upper layer PDUs

Out-of-sequence delivery of upper layer PDUs

PDCP PDU reordering for reception

Duplicate detection of lower layer SDUs

Retransmission of PDCP SDUs

Ciphering and deciphering

Timer-based SDU discard in uplink

In the above description, the reordering function of the NR PDCP entity 1d-05 or 1d-40 may indicate a function of reordering PDCP PDUs received in a lower layer in order based on PDCP sequence numbers (SN). The reordering function of the NR PDCP entity 1*d*-05 or 1*d*-40 may include a function of transferring data to an upper layer in a reordered order, a function of directly transferring data without considering the order, a function of reordering the order and recording lost PDCP PDUs, a function of reporting status of the lost PDCP PDUs to a transmission side, and requesting retransmission of the lost PDCP PDUs.

The major functions of the NR RLC 1*d*-10 or 1*d*-35 may include some of functions below.

Transfer of upper layer PDUs
   In-sequence delivery of upper layer PDUs
   Out-of-sequence delivery of upper layer PDUs
   ARQ (Error correction through ARQ)
   Concatenation, segmentation, and reassembly of RLC SDUs
   Re-segmentation of RLC data PDUs
   Reordering of RLC data PDUs
   Duplicate detection
   Protocol error detection
   RLC SDU discard
   RLC re-establishment In the above description, an in-sequence delivery function of an NR RLC entity may indicate a function of transferring RLC SDUs received from a lower layer to an upper layer in order. When an originally single RLC SDU is received after being segmented into multiple RLC SDUs, the in-sequence delivery function of the NR RLC entity may include a function of reassembling the RLC SDUs and transferring the same.

The in-sequence delivery function of the NR RLC entity may include a function of reordering the received RLC PDUs based on RLC SNs or PDCP SNs. Also, the in-sequence delivery function of the NR RLC entity 1*d*-10 or 1*d*-35 may include a function of reordering the order and recording lost PDCP PDUs, a function of reporting status of the lost PDCP PDUs to a transmission side, or a function of requesting retransmission of the lost PDCP PDUs. When there is a lost RLC SDU, the in-sequence delivery function of the NR RLC entity 1*d*-10 or 1*d*-35 may include a function of transferring only RLC SDUs before the lost RLC SDU, to an upper layer in order. Also, even when there is a lost RLC SDU, when a certain timer has expired, the in-sequence delivery function of the NR RLC entity 1*d*-10 or 1*d*-35 may include a function of transferring all of received RLC SDUs to an upper layer in order, before the timer starts. Also, even when there is a lost RLC SDU, when a certain timer has expired, the in-sequence delivery function of the NR RLC entity 1*d*-10 or 1*d*-35 may include a function of transferring all of RLC SDUs received up to present, to an upper layer in order.

The NR RLC entity 1*d*-10 or 1*d*-35 may also sequentially process RLC PDUs regardless of an order of SNs but in order of receiving them (out-of sequence delivery) and transfer the same to the NR PDCP entity 1*d*-05 or 1*d*-40 regardless of the order. When the NR RLC entity 1*d*-10 or 1*d*-35 receives segments, segments that are stored in a buffer or that are to be received later may be received and reconfigured to a complete single RLC PDU, and this RLC PDU may be transferred to the NR PDCP entity 1*d*-05 or 1*d*-40.

The NR RLC layer 1*d*-10 or 1*d*-35 may not include a concatenation function, and may perform the above-described functions in an NR MAC layer or replace the concatenation function with a multiplexing function of an NR MAC layer.

In the above description, the out-of-sequence delivery function of an NR RLC entity may indicate a function of transferring RLC SDUs received from a lower layer directly to an upper layer regardless of an order. When an originally single RLC SDU is segmented into multiple RLC SDUs and received, the out-of-sequence delivery function of the NR RLC entity may include a function of reassembling the RLC SDUS and transferring the same. The out-of-sequence delivery function of the MR RLC entity of the NR RLC entity may include a function of storing RLC SNs or PDCP SNs of received RLC PDUs and reordering the RLC PDUs and recording lost RLC PDUs.

The NR MAC 1*d*-15 or 1*d*-30 may be connected to several NR RLC layers configured in one terminal, and the major functions of the NR MAC 1*d*-15 or 1*d*-30 may include some of functions below.

Mapping between logical channels and transport channels
   Multiplexing/demultiplexing of MAC SDUs
   Scheduling information reporting
   HARQ (Error correction through HARQ)
   Priority handling between logical channels of one UE
   Priority handling between UEs by means of dynamic scheduling
   MBMS service identification
   Transport format selection
   Padding The NR PHY layer 1*d*-20 or 1*d*-25 may perform channel coding or modulation on upper layer data and convert the same into an OFDM symbol and transmit the OFDM symbol to a wireless channel, or demodulate an OFDM symbol received via a wireless channel and perform channel decoding on the demodulated OFDM symbol and transfer the channel-decoded OFDM symbol to an upper layer.

Figure 1E:
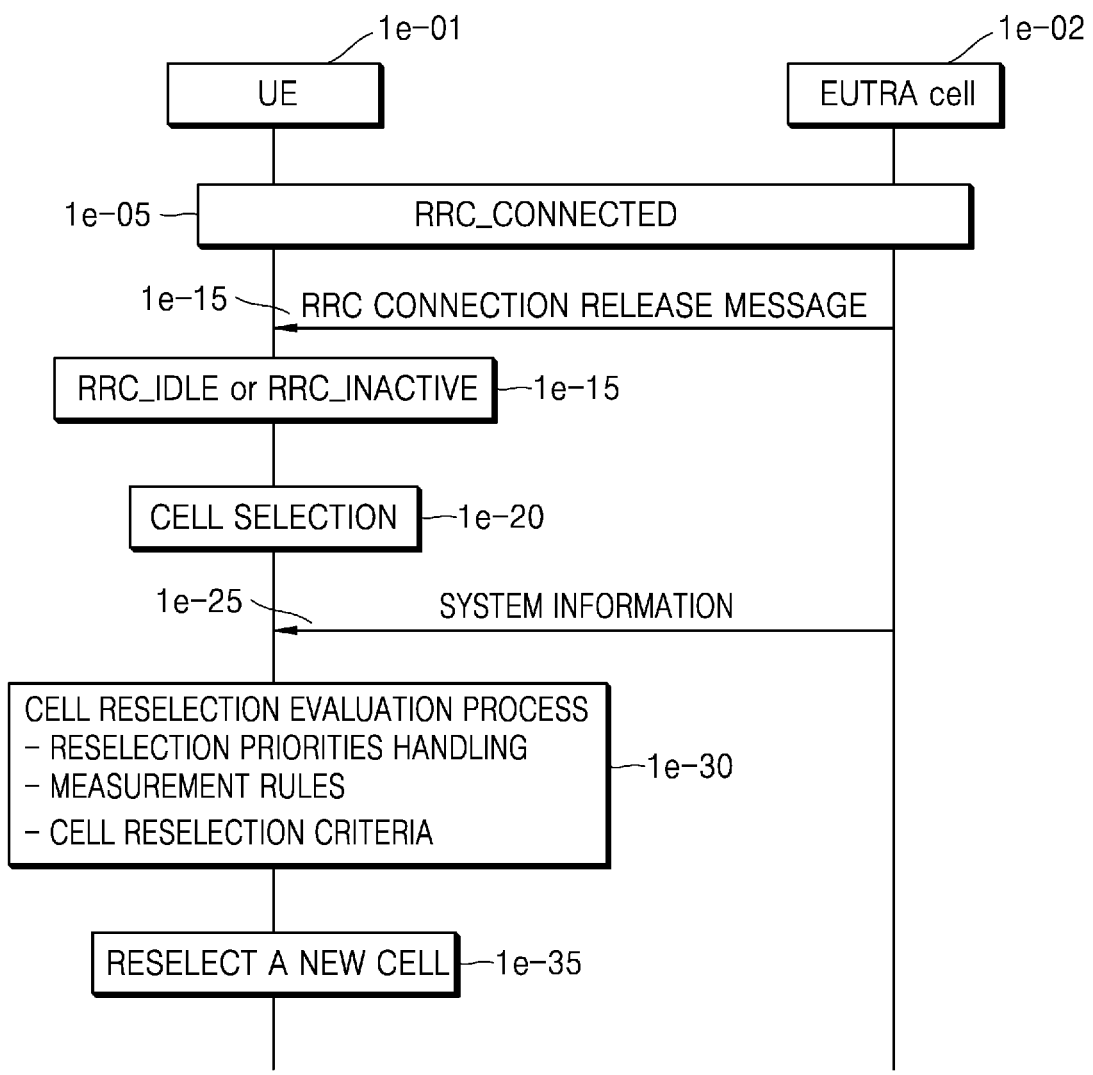
FIG. 1E is a diagram for describing a process of reselecting a cell, performed by a terminal that is in a radio resource control (RRC) inactive mode RRC_INACTIVE or an RRC idle mode RRC_IDLE in an LTE system, according to an embodiment of the disclosure.

FIG. 1E is a diagram for describing a process of reselecting a cell, performed by a terminal that is in an RRC inactive mode RRC_INACTIVE or an RRC idle mode RRC_IDLE in an LTE system, according to an embodiment of the disclosure.

A cell reselection process may indicate a procedure of determining, by a terminal that is in an RRC idle mode or an RRC inactive mode, whether to maintain a current serving cell or reselect a neighbor cell as a serving cell when a service quality of the serving cell is lower than that of a neighbor cell due to a certain reason or due to movement of the terminal.

Whether to perform a handover is determined by a network, whereas cell reselection may be determined by a terminal itself based on cell measurement values. A cell that is reselected by a terminal as the terminal moves may indicate a neighbor cell that uses the same RAT as the current serving cell or a cell that uses another RAT. Reselecting a neighbor cell that uses a different RAT from the current serving cell may be referred to as inter-RAT cell reselection. When a cell that uses the same RAT as the current serving cell or a neighbor cell that is located at a same infrequency (intra-frequency) as the current serving cell is reselected, it may be referred to as intra-frequency cell reselection. Also, reselecting a cell located at a different frequency (inter-frequency) may be referred to as inter-frequency cell reselection. According to an embodiment of the disclosure, when a current serving cell is an Evolved Universal Mobile Telecommunications System (UMTS) Terrestrial Radio Access (E-UTRA) cell, it may be referred to as Evolved UMTS Terrestrial Radio Access Network (E-UTRAN) intra-frequency cell reselection or E-UTRAN inter-frequency cell reselection.

Referring to FIG. 1E, a terminal 1*e*-01 may establish an RRC connection with a base station 1*e*-02 and be in an RRC connected mode RRC_CONNECTED (1*e*-05).

In operation 1e-10, when there is no data transmission or reception for a certain reason or a certain period, the base station 1e-02 may transmit an RRC connection release message (RRCConnectionRelease) to the terminal 1e-01. The RRC connection release message may include RRC inactivation configuration information (rrc-InactiveConfig).

In operation 1e-15, when the RRC inactivation configuration information is included in the RRC connection release message, the terminal 1e-01 may transition to an RRC inactive mode, and when the RRC inactivation configuration information is not included in the RRC connection release message, the terminal 1e-01 may transition to an RRC idle mode. The RRC inactivation configuration information may be included in idleModeMobilityControlInfo.

Frequency priority configuration information for each RAT may include one of at least one parameter below.

- one or more CarrierFreqs or one or more bandClasses: a value indicating each frequency or band may be included. For example, an absolute radio frequency channel number (ARFNN) may be included.
- a frequency priority value for each CarrierFreq or each bandClass: for example, a frequency priority value for each CarrierFreq or each bandClass may denote cellReselectionPriority and/or cellReselectionSubPriority, and cellReselectionPriority may have an integer value, and cellReselectionSubPriority may have a value of a prime number. When cellReselectionPriority and cellReselectionSubPriority are both signaled, a terminal may derive a frequency priority value by adding the two values.
- T320 timer value In the RRC connection release message transmitted in operation 1e-10, for each RAT (e.g., EUTRA, Global System for Mobile Communications (GSM) Enhanced Data GSM Evolution (EDGE) Radio Access Network (GERAN), UMTS Terrestrial Radio Access-frequency-division duplexing (UTRA-FDD), UTRA-time-division duplexing (UTRA-TDD), High Rate Packet Data (HRPD), single carrier Radio Transmission Technology (1×RTT), and NR), one or more pieces of frequency priority configuration information and a time value that is applicable regardless of RAT (e.g., idleModeMobilityControlInfo) may be included. In this case, the terminal 1e-01 may store the one or more pieces of frequency priority configuration information for each RAT. When a T320 timer value is included in the RRC connection release message, the T320 timer value is configured as a value of a T320 timer so as to run the T320 timer.

Meanwhile, when one or more pieces of frequency priority configuration information and a timer value that is applicable regardless of RAT are not included in the RRC connection release message transmitted in operation 1e-10, for each RAT, or the T320 timer is expired, cell reselection priority information that is broadcast in system information may be applied.

In operation 1e-20, the 1e-01 that is in an RRC idle mode or an RRC inactive mode may perform a cell selection process. According to whether the RRC connection release message received in operation 1e-10 includes redirectedCarrierInfo (an information element that may include value(s) indicating one or more frequencies or bands for a particular RAT), the terminal 1e-01 may perform a cell selection process as below.

Case 1: When redirectedCarrierInfo is included in the RRC connection release message, the terminal 1e-01 may camp on a suitable cell according to redirectedCarrierInfo. When a suitable cell according to redirectedCarrierInfo is not found, the terminal 1e-01 may camp on any suitable cell of the indicated RAT.

Case 2: When redirectedCarrierInfo is not included in the RRC connection release message, the terminal 1e-01 may select a suitable cell in a EUTRA carrier.

Case 3: When a suitable cell is not found in Case 1 or Case 2, the terminal 1e-01 may perform a cell selection process based on information stored to camp on a suitable cell.

In operation 1e-20, the cell selection criteria may indicate a case satisfying [Equation 1] below.

$$Srxlev > 0 \text{ AND } Squal > 0 \quad \text{[Equation 1]}$$

where:

$$Srxlev = Qrxlevmeas - (Qrxlevmin + Qrxlevminoffset) - Pcompensation - Qoffsettemp$$

$$Squal = Qqualmneas - (Qqualmin + qualminoffset) - Qoffsettemp$$

For the definitions of parameters used in [Equation 1], the 3GPP standard document "36.304: User Equipment (UE) procedures in idle mode" may be referred to, and the parameters may be included in system information (e.g., SIB1, SIB2) broadcast by a cell. This applies the same to embodiments of the disclosure to which [Equation 1] is applied.

In operation 1e-255, the terminal 1e-01 may obtain or receive system information (SIB3, SIB4 . . . , SIB8, SIB24). Each piece of system information may include one or more pieces of frequency priority configuration information for each RAT (i.e., cell reselection priority information for each RAT). For example, when the terminal 1e-01 has camped on an E-UTRA cell through a cell selection process in operation 1e-20, frequency priority configuration information for each RAT may be included in system information in the following form.

SIB3: priority configuration information of a serving frequency (a frequency to which a currently camped-on cell belongs)

SIB5: frequency priority configuration information for each EUTRA inter-frequency SIB6: frequency priority configuration information for each UTRA frequency (UTRA-FDD, UTRA-TDD)

SIB7: frequency priority configuration information for each GERAN frequency

SIB8: frequency priority configuration information for each CDMA2000

SIB24: frequency priority configuration information for each NR frequency

Also, in SIB3, SIB4, SIB4, SIB5, SIB6, SIB7, SIB8, and SIB24, parameters for reselecting cells may be further included.

In operation 1e-30, the terminal 1e-01 may perform a cell reselection evaluation process. The terminal 1e-01 may perform a cell reselection evaluation process on E-UTRAN frequencies and inter-RAT frequencies that are broadcast in the provided frequency priority configuration information and the provided system information (The UE shall only perform cell reselection evaluation for E-UTRAN frequencies and inter-RAT frequencies that are given in system information and for which the UE has a priority provided). The cell reselection evaluation process may indicate a series of following processes.

Reselection priorities handling

Measurement rules for cell reselection

Cell reselection criteria

A method of reselecting a cell may be determined based on the one or more pieces of frequency priority configuration information for each RAT and whether a timer value that is applicable regardless of RAT are included in the RRC connection release message received in operation 1e-10. For example, a cell reselection method as follows may be used.

When one or more pieces of frequency priority configuration information for each RAT and a time value that is applicable regardless of RAT are included in the RRC connection release message, while the T320 timer is driven, the frequency priority configuration information in the system information obtained in operation 1e-25 may be ignored, and a cell may be reselected by applying the frequency priority configuration information included in the RRC connection release message. When the T320 timer is expired, in operation 1e-25, the terminal 1e-01 may reselect a cell by applying the frequency priority configuration information in the obtained system information.

When one or more pieces of frequency priority configuration information for each RAT and a time value that is applicable regardless of RAT are not included in the RRC connection release message, the terminal 1c-01 may reselect a cell by applying the frequency priority configuration information in the system information Obtained in operation 1e-25.

The terminal 1e-01 may perform neighbor cell measurement based on the following measurement rules by applying frequency priority for certain reasons or to minimize battery consumption.

When a reception level and a reception quality of a serving cell are higher than a threshold value (Srxlev>SIntraSearchP and SIntraSearchQ), the terminal 1e-01 may not perform EUTRA intra-frequency measurement. —Otherwise, the terminal 1e-01 may perform EUTRA intra-frequency measurement.

The terminal 1e-01 may perform neighbor cell measurement on a EUTRA inter-frequency or an inter-RAT frequency having a higher reselection priority than a frequency of a current serving cell.

When a reception level and a reception quality of a serving cell is higher than a threshold value (Srxlev>SIntraSearchP and SIntraSearchQ), the terminal 1e-01 may not perform measurement on an EUTRA inter-frequency that has a reselection priority equal to or lower than that of a frequency of the current serving cell or an inter-RAT frequency that has a lower reselection priority than that of the frequency of the current serving cell. Otherwise, the terminal 1e-01 may perform measurement on a EUTRA inter-frequency or an inter-RAT frequency that has a reselection priority lower than or equal to that of the frequency of the current serving cell.

For reference, the threshold values (SIntraSearchP, SIntraSearchQ, SnonIntraSearchP, SnonIntraSearchQ) and the reception level and the reception quality of the serving cell may be obtained or derived based on the system information received in operation 1e-25. In addition, with respect to a frequency having an equal priority to that of a serving frequency or a frequency having a lower priority than the serving frequency, the terminal 1e-01 may measure a neighbor cell with respect to that frequency when a mobility state of the terminal 1e-01 is not low mobility.

The terminal 1e-01 may apply different cell reselection evaluation criteria according to frequency priorities. In detail, the terminal 1e-01 may apply different cell reselection criteria to the following four cases.

First case: When there is at least one E-UTRAN frequency or inter-RAT frequency having a higher priority than a current serving frequency.
Second case: When there is at least one E-UTRAN frequency or inter-RAT frequency having a lower priority than a current serving frequency.
Third case: When there is at least one current serving frequency or at least one E-UTRAN inter-frequency having an equal priority to that of a current serving frequency.

When applying the cell reselection criteria to the first case,
when the terminal 1e-01 determines that threshServingLowQ is included in system information (for example, SIB3) broadcast by a serving cell and a certain period of time has passed after the terminal 1e-01 has camped on the current serving cell (for example, 1 second),
a cell satisfying Condition A may be reselected.
Condition A: A cell in EUTRAN, NR or UTRAN FDD RAT/frequency having a high priority satisfies Squal>ThreshX,HighQ during a period of TreselectionRAT or a cell in UTRAN TDD, GERAN or CDMA2000 RAT/frequency having a high priority satisfies Squal>ThreshX,HighP during a period of TreselectionRAT.
Otherwise, when a certain period of time has passed after the terminal 1e-01 has camped on the current serving cell (for example, 1 second) and a cell in RAT/frequency having a high priority satisfies Srxlev>ThreshX,HighP during a period of TreselectionRAT, the terminal 1e-01 may reselect the cell.

When applying the cell reselection criteria to the second case,
when the terminal 1e-01 determines that threshServingLowQ is included in system information (for example, SIB3) broadcast by a serving cell and a certain period of time has passed after the terminal 1e-01 has camped on the current serving cell (for example, 1 second),
a cell satisfying Condition B may be reselected.
Condition B: A serving cell satisfies Squal<ThreshServing,LowQ and a cell in EUTRAN, NR or UTRAN FDD RAT/frequency having a low priority satisfies Squal>ThreshX,LowQ during a period of TreselectionRAT or a serving cell satisfies Squal<ThreshServing,LowQ and a cell in UTRAN TDD, GERAN or CDMA2000 RAT/frequency having a low priority satisfies Squal>ThreshX,LowP during a period of TreselectionRAT.
Otherwise, when a certain period of time has passed after the terminal 1e-01 has camped on the current serving cell (for example, 1 second) and a cell in RAT/frequency having a low priority satisfies Srxlev>ThreshX,LowP during a period of TreselectionRAT, the terminal 1e-01 may reselect the cell.

When applying the cell reselection criteria to the third case, the terminal 1e-01 may determine the ranking of all cells that satisfy the cell selection criteria. That is, for all cells satisfying the cell selection criteria, the terminal 1e-01 may derive ranking of each cell based on Reference Signal Received Power (RSRP) measurement values. Ranks of a serving cell and a neighbor cell may be respectively calculated based on [Equation 2] below.

$$Rs = Q_{meas,s} + Q_{hyst} - Q_{offsettemp} + Q_{offsetSCPTM}$$

$$Rn = Q_{meas,n} - Q_{offset} - Q_{offsettemp} + Q_{offsetSCPTM} \quad \text{[Equation 2]}$$

For the definitions of parameters used in [Equation 2], the 3GPP standard document "36.304: User Equipment (UE) procedures in idle mode" may be referred to, and the parameters may be included in system information broadcast by a cell. This applies the same to embodiments of the disclosure to which [Equation 2] is applied. The terminal 1e-01 may reselect a cell that is ranked highest (If a cell is ranked as the best cell the UE shall perform cell reselection to that cell). In any case, the terminal 1e-01 may reselect a new cell when following conditions are met.

When a new cell is ranked higher than a serving cell during a period of TreselectionRAT.

When a certain period of time (e.g., 1 second) has passed after camping on a current serving cell.

When a plurality of cells that satisfy the cell reselection criteria in the first case, the second case, or the third case have different priorities, the terminal 1e-10 may perform cell reselection such that a RAT/frequency having a higher priority take precedence over a RAT/frequency having a lower priority (Cell reselection to a higher priority RAT/frequency shall take precedence over a lower priority RAT/frequency, if multiple cells of different priorities fulfill the cell reselection criteria). When reselecting a cell in the first case or the second case, and a plurality of cells satisfy the cell reselection criteria, the terminal 1e-01 may reselect a cell that has a highest ranking among cells at a frequency (at frequencies) having a highest priority. For reference, parameters applied to the cell reselection criteria may be included in the system information received in operation 1e-25. Also, TreselectionRAT parameters may be scaled based on a mobility state of the terminal 1e-01. For example, for an E-UTRA cell and in the case of a high-mobility state, TreselectionEUTRA may be multiplied by sf-High(Speed dependent Scaling Factor for TreselectionEUTRA) to derive TreselectionEUTRA. Qhyst parameters may be scaled based on a mobility state of the terminal 1e-01. For example, for an E-UTRA cell and in the case of a high-mobility state, sf-High(Speed dependent Scaling Factor for TreselectionEUTRA) may be added to Qhyst to derive Qhyst.

In operation 1e-35, the terminal 1e-01 in an RRC idle mode or an RRC inactive mode may reselect a new cell through operation 1e-30.

FIG. 1F is a diagram for describing a process of reselecting a cell, performed by a terminal that is in an RRC inactive mode RRC_INACTIVE or an RRC idle mode RRC_IDLE in a next-generation mobile communication system, according to an embodiment of the disclosure.

Referring to FIG. 1F, in operation 1f-05, a terminal 1f-01 may convert into an RRC connected mode RRC_CONNECTED through an RRC establishment process or an RRC resume process with a base station 1f-02.

In operation 1f-10, the terminal 1f-01 in an RRC connected mode may transmit UECapabilityInformation including an IRAT-ParametersNR information element to the base station 1f-02. At least one of the followings may be included in the IRAT-ParametersNR information element.

an indicator indicating whether en-DC is supported
an indicator indicating whether ng-en-dc is supported
an indicator indicating whether eventB2 is supported
NR band information that is supportable by a terminal in (NG)en-dc
an indicator indicating that a frequency priority that is configured as a dedicated one is switchable to a frequency priority included in broadcasting signaling In operation 1f-15, the base station 1f-02 may transmit an RRC connection release message to the terminal 1f-01 to make the terminal 1f-01 which is in an RRC connected mode to transition into an RRC idle mode or an RRC inactive mode. In the RRC connection release message, a cell reselection priority (CRP) with respect to a first RAT, a CRP with respect to a second RAT, and a T320 timer value may be included. For example, the above-described information may be included in an idleModeMobilityControlInfo information element that may be included in the RRC connection release message. The CRP may indicate a frequency priority value for each frequency. The first RAT according to an embodiment of the disclosure may indicate EUTRA, and the second RAT according to an embodiment of the disclosure may indicate other RATs except for EUTRA (e.g., NR, UTRA-FDD, UTRA-TDD, CDMA2000). When the CRP with respect to the first RAT and/or the CRP with respect to the second RAT are included in the RRC connection release message, the terminal 1f-01 may store the CRPs. A CRP may indicate the one or more pieces of frequency priority configuration information for each RAT in the above-described embodiment of the disclosure. When the T320 timer value is included in the RRC connection release message, the T320 timer value may be configured as a value of a T320 timer so as to run the T320 timer. When the T320 timer is expired, the terminal 1f-01 may discard the frequency priority configuration information received and configured via the RRC connection release message.

In operation 1f-20, the terminal 1f-01 that has transitioned to an RRC idle mode or an RRC inactive mode may perform a cell selection process. Referring to FIG. 1F, for convenience of description, a cell, with which the terminal 1f-01 performed RRC connection, and a cell on which the terminal 1f-01 has camped on are illustrated to be the same. However, the cell that the terminal 1f-01 has camped on may be obviously be different from the cell, with which the terminal 1f-01 has performed RRC connection. That is, the terminal 1f-01 may select a suitable cell to camp on, and the selected cell may be an RRC-connected cell or not. The above description may also apply to cell selection processes to be described below with reference to FIGS. 1G through 1L.

In operation 1f-25, the terminal 1f-01 may receive system information from the cell it has camped on through cell selection. In the system information, parameters for cell reselection may be included. For example, following parameters may be included:

CRP information regarding the first RAT: SIB3 and SIB5
A first CRP (legacy CRP) and a second CRP (CRP for EN-DC) of a serving frequency are included in SIB3.
A first CRP and a second CRP for each first RAT inter-frequency are included in SIB5.
CRP information regarding the second RAT: SIB6, SIB7, SIB8, SIB24
A first CRP for each frequency of the second RAT. For example, in SIB6, a CRP for each UTRA frequency may be included, and in SIB24, a CRP for each NR Frequency may be included.

For convenience of description, it will be described that two CRPs may be included per E-UTRAN frequency in system information, with respect to the first RAT, and with respect to the second RAT, one CRP may be included per frequency in the system information. That is, two or more CRPs may be included per E-UTRAN frequency in the system information, with respect to the first RAT, or multiple CRPs may be included per frequency in the system information with respect to the second RAT. The above description may obviously be applied below.

In operation 1*f*-30, the terminal 1*f*-01 may perform a cell reselection evaluation process. The terminal 1*f*-01 may perform a cell reselection evaluation process on EUTRA frequencies and inter-RAT frequencies that broadcast in the provided frequency priority configuration information and the provided system information (The UE shall only perform cell reselection evaluation for E-UTRAN frequencies and inter-RAT frequencies that are given in system information and for which the LTE has a priority provided). The cell reselection evaluation process may indicate a series of following processes.

Reselection priorities handling
Measurement rules for cell reselection
Cell reselection criteria The reselection priorities handling may be applied differently in a first RAT and a second RAT based on the capability of the terminal 1*f*-01 that is in an RRC idle mode or an RRC inactive mode.

When the terminal 1*f*-01 is an (NG)EN-DC capable terminal, and NR is enabled, or the terminal 1*f*-01 is an (NG)EN-DC capable terminal, and NR is enabled and a frequency priority that is configured as a dedicated one is switchable to a frequency priority included in broadcast signaling, a frequency priority may be determined by applying the second CRP included in SIM to a current serving frequency. That is, even when the CRP with respect to the first RAT is included in the RRC connection release message received in operation 1*f*-15, the terminal 1*f*-01 may apply the second CRP included in the received SIB3. This may be applied regardless of driving of the T320 timer.

When the terminal 1*f*-01 is an (NG)EN-DC capable terminal, and NR is enabled, or the terminal 1*f*-01 is an (NG)EN-DC capable terminal, and NR is enabled, and a frequency priority that is configured as a dedicated one is switchable to a frequency priority included in broadcast signaling, the terminal 1*f*-01 may determine frequency priority by applying the second CRP included in SIB5 to an E-UTRAN inter-frequency. That is, even when the CRP with respect to the first RAT is included in the RRC connection release message received in operation 1*f*-15, the terminal 1*f*-01 may apply the second CRP included in the received SIB5. This may be applied regardless of driving of the T320 timer.

When the terminal 1*f*-01 is an (NG)EN-DC capable terminal but NR is disabled, or the terminal 1*f*-01 is an (NG)EN-DC capable terminal but a frequency priority that is configured as a dedicated one is not switchable to a frequency priority included in broadcast signaling, the terminal 1*f*-01 may determine frequency priority with respect to the current serving frequency and the E-UTRAN inter-frequency by applying the CRP with respect to the first RAT included in the RRC connection release message received in operation 1*f*-15. That is, even when the first CRP and/or the second CRP with respect to the first RAT are included in the system information received in operation 1*f*-25, the terminal 1*f*-01 may ignore them and apply the CRP with respect to the first RAT, included in the RRC connection release message, while the T320 timer is driven. When the T320 timer is expired or the T320 timer does not run, the terminal 1*f*-01 may apply the first CRP with respect to the first RAT to the system information received in operation 1*f*-25 with respect to the current serving frequency and the E-UTRAN inter-frequency.

The terminal 1*f*-01 may determine frequency priority by applying the CRP with respect to the second RAT, included in the PAC connection release message received in operation 1*f*-15, with respect to the second RAT. That is, even when the first CRP with respect to the second RAT is included in the system information received in operation 1*f*-25, the terminal 1*f*-01 may ignore this and apply the CRP with respect to the second RAT, included in the RRC connection release message while the T320 timer is driven. When the T320 timer is expired or the T320 timer does not run, the terminal 1*f*-01 may determine frequency priority by applying the first CRP with respect to the second RAT, to the system information received in operation 1*f*-25, with respect to the second RAT.

Regarding measurement rules, the terminal 1*f*-01 may perform neighbor cell measurement based on the measurement rules by applying frequency priority for certain reasons or to minimize battery consumption. This may be the same as in the above-described embodiment of the disclosure.

As to the cell reselection evaluation criteria, the terminal 1*f*-01 may apply different cell reselection evaluation criteria according to frequency priorities. This may be the same as in the above-described embodiment of the disclosure.

In operation 1*f*-35, the terminal 1*f*-01 in an RRC idle mode or an RRC inactive mode may reselect a new cell 1*f*-03 through operation 1*f*-30.

In operation 1*f*-40, the terminal 1*f*-01 may obtain system information including cell reselection parameters from the reselected cell 1*f*-03.

In operation 1*f*-45, when the second CRP with respect to the first RAT is included in the received system information, operation 1*f*-30 described above may be performed to perform a cell reselection procedure. When only the first CRP with respect to the first RAT is included in the received system information, while the T320 timer is driven, the terminal 1*f*-01 may perform a cell reselection procedure by applying the CRP with respect to the first RAT and the CRP with respect to the second RAT included in the RRC connection release message received in operation 1*f*-15. When only the first CRP is included in the received system information with respect to the first RAT, and the T320 timer is expired or does not run, the terminal 1*f*-01 may perform a cell reselection procedure by applying the CRP with respect to the first RAT and the CRP with respect to the second RAT included in the system information received in operation 1*f*-40.

In the embodiment of the disclosure, (NG)EN-DC is described as an example for convenience of description. However, the embodiments of the disclosure are not limitedly applied only to (NG)EN-DC but may also be applied to NE-DC and NR-DC based on the same principle.

FIG. 1G is a diagram for describing a process of reselecting a cell, performed by a terminal that is in an RRC inactive mode RRC_INACTIVE or an RRC idle mode RRC_IDLE in a next-generation mobile communication system, according to an embodiment of the disclosure.

Referring to FIG. 1G, in operation 1*g*-05, a terminal 1*g*-01 may convert into an RRC connected mode RRC_CONNECTED through an RRC establishment process or an RRC resume process with a base station 1*g*-02.

In operation 1*g*-10, the terminal 1*g*-01 in an RRC connected mode may transmit UECapabilityInformation including an IRAT-ParametersNR information element to the base station 1*g*-02. At least one of the followings may be included in the IRAT-ParametersNR information element.

an indicator indicating whether en-DC is supported
an indicator indicating whether ng-en-dc is supported
an indicator indicating whether eventB2 is supported NR band information that is supportable by a terminal in (NG)en-dc an indicator indicating that a frequency priority that is configured as a dedicated one is switchable to a frequency priority included in broadcasting signaling In operation 1g-15, the base station 1g-02 may transmit an RRC connection release message to the terminal 1g-01 to make the terminal 1g-01 which is in an RRC connected mode to transition into an RRC idle mode or an RRC inactive mode. In the RRC connection release message, a CRP with respect to a first RAT, a CRP with respect, to a second RAT, a T320 timer value, and notOverRideIndication (an indicator indicating to ignore a frequency priority included in, for example, broadcast signaling (e.g., system information) but to apply frequency priority that is configured through dedicated signaling (e.g., RRC connection release message)) may be included. For example, the above-described information may be included in an idleModeMobilityControlInfo information element that may be included in the RRC connection release message. The first RAT according to an embodiment of the disclosure may indicate EUTRA, and the second RAT according to an embodiment of the disclosure may indicate other RATs except for EUTRA (e.g., NR, UTRA-FDD, CDMA2000). When the CRP with respect to the first RAT and/or the CRP with respect to the second RAT are included in the RRC connection release message, the terminal 1g-01 may store the CRPs. A CRP may indicate the one or more pieces of frequency priority configuration information for each RAT in the above-described embodiment of the disclosure. When the T320 timer value is included in the RRC connection release message, the T320 timer value may be configured as a value of a T320 timer so as to run the T320 timer. When the T320 timer is expired, the terminal 1g-01 may discard the frequency priority configuration information received and configured via the RRC connection release message.

In operation 1g-20, the terminal 1g-01 that has transitioned to an RRC idle mode or an RRC inactive mode may perform a cell selection process.

In operation 1g-25, the terminal 1g-01 may receive system information from a cell it has camped on through cell selection. In the system information, parameters for cell reselection may be included. For example, following parameters may be included:

CRP information regarding the first RAT: SIB3 and SIB5
A first CRP (legacy CRP) and a second CRP (CRP for EN-DC) of a serving frequency may be included in SIB5.
A first CRP and a second CRP for each first RAT inter-frequency may be included in SIB5.
CRP information regarding the second RAT: SIB6, SIB7, SIB8, SIB24
A first CRP for each frequency of the second RAT. For example, in SIB6, a CRP for each UTRA frequency may be included, and in SIB24, a CRP for each NR frequency may be included.

For convenience of description, it will be described that two CRPs may be included per E-UTRAN frequency in system information, with respect to the first RAT, and with respect to the second RAT, one CRP may be included per frequency in system information. That is, two or more CRPs may be included per E-UTRAN frequency in the system information, with respect to the first RAT, or with respect to the second RAT, multiple CRPs may be included per frequency in the system information. The above description may obviously be applied below.

In operation 1g-30, the terminal 1g-01 may perform a cell reselection evaluation process. The terminal 1g-01 may perform a cell reselection evaluation process on EUTRA frequencies and inter-RAT frequencies that are provided in the provided frequency priority configuration information and the provided system information (The UE shall only perform cell reselection evaluation for E-UTRAN frequencies and inter-RAT frequencies that are given in system information and for which the UE has a priority provided). The cell reselection evaluation process may indicate a series of following processes.

Reselection priorities handling
Measurement rules for cell reselection
Cell reselection criteria The reselection priorities handling may be applied differently in a first RAT and a second RAT based on the capability of the terminal 1g-01 that is in an RRC idle mode or an RRC inactive mode and whether the RRC connection release message received in operation 1g-15 includes notOverRideIndication.

When notOverRideIndication is included in the received RRC connection release message and is supported by the terminal 1g-01, the terminal 1g-01 may apply the frequency priority configuration information by applying a CRP included in the RRC connection release message while the T320 timer is driven. That is, the terminal 1g-01 may ignore the CRP of the system information received in operation 1g-25. The reason why notOverRideIndication is included in the RRC connection release message is that the base station 1g-02 has included the frequency priority configuration information by considering the capability of the terminal 1g-01, When the T320 timer is expired or does not run, the terminal 1g-01 may apply the frequency priority configuration information based on the CRP included in the system information received in operation 1g-25. For example, when the terminal 1g-01 is an (NG)EN-DC capable terminal, and NR is enabled, or the terminal 1g-01 is an (NG)EN-DC capable terminal, and NR is enabled, and a frequency priority that is configured as a dedicated one is switchable to a frequency priority included in broadcast signaling, the second CRP in SIB3 and SIB5 may be applied to the first RAT, and the first CRP may be applied to the second RAT. Otherwise, the first CRP in SIB3 and SIB5 may be applied to the first RAT, and the first CRP may be applied to the second RAT When notOverRideIndication is not included in the received RRC connection release message, and the terminal 1g-01 is an (NG)EN-DC capable terminal, and NR is enabled, or the terminal 1g-01 is an (NG)EN-DC capable terminal, and NR is enabled, and a frequency priority that is configured as a dedicated one is switchable to a frequency priority included in broadcast signaling, the terminal 1g-01 may determine frequency priority by applying the second CRP included in SIB3 to a current serving frequency and determine frequency priority by applying the second CRP included in SIB5 to an E-UTRAN inter-frequency. That is, even when the CRP with respect to the first RAT is included in the RRC connection release message received in operation 1g-15, the terminal 1g-01 may apply the second CRP included in the received SIB3/SIB5. This may be applied regardless of driving of the T320 timer. When the terminal 1g-01 is an (NG)EN-DC capable terminal and NR is disabled, or a frequency priority that is configured as a dedicated one is not switchable to a frequency priority included in broadcast signaling, the terminal 1g-01 may determine frequency priority by applying the CRP with respect to the first RAT to the E-UTRAN frequency in the RRC connection release message, while the T320 timer is driven.

The terminal 1g-01 may apply, to the second RAT, the CRP with respect to the second RAT included in the RRC connection release message received in operation 1g-15. That is, even when the first CRP with respect to the second RAT is included in the system information received in operation 1g-25, the terminal 1g-01 may ignore this and apply the CRP with respect to the second RAT, included in the RRC connection release message while the T320 timer is driven. When the T320 timer is expired or the T320 timer does not run, the terminal 1g-01 may apply, to the second RAT, the first CRP with respect to the second RAT included in the system information received in operation 1g-25.

The terminal 1g-01 may perform neighbor cell measurement based on the following measurement rules by applying frequency priority for certain reasons or to minimize battery consumption. This may be the same as in the above-described embodiment of the disclosure.

The terminal 1g-01 may apply different cell reselection evaluation criteria according to frequency priorities. This may be the same as in the above-described embodiment of the disclosure.

In operation 1g-35, the terminal 1g-01 in an RRC idle mode or an RRC inactive mode may reselect a new cell 1g-03 through operation 1g-30.

In operation 1g-40, the terminal 1g-01 may obtain system information including cell reselection parameters from the reselected cell 1g-03.

In operation 1g-45, when a second CRP with respect to the first RAT is included in the received system information, the terminal 1g-01 may perform operation 1g-30 described above to perform a cell reselection procedure. When a second CRP with respect to the first RAT is not included in the system information received in operation 1g-40, the terminal 1g-01 may perform a cell reselection procedure by determining frequency priority based on the received system information or may perform a cell reselection procedure by determining frequency priority based on the RRC connection release message received in operation 1g-15 while the T320 timer is driven.

In the embodiment of the disclosure, (NG)EN-DC is described as an example for convenience of description. However, the embodiments of the disclosure are not limitedly applied only to (NG)EN-DC but may also be applied to NE-DC and NR-DC based on the same principle.

FIG. 1H is a diagram for describing a process of reselecting a cell, performed by a terminal that is in an RRC inactive mode RRC_INACTIVE or an RRC idle mode RRC_IDLE in a next-generation mobile communication system, according to an embodiment of the disclosure.

Referring to FIG. 1H, in operation 1h-05, a terminal 1h-01 may convert into an RRC connected mode RRC_CONNECTED through an RRC establishment process or an RRC resume process 1h-05 with a base station 1h-02.

In operation 1h-10 the terminal 1h-01 in an RRC connected mode may transmit UECapabilityInformation including an IRAT-ParametersNR information element to the base station 1h-02. At least one of the followings may be included in the IRAT-ParametersNR information element.
  an indicator indicating whether en-DC is supported
  an indicator indicating whether ng-en-dc is supported
  an indicator indicating whether eventB2 is supported
  NR band information that is supportable by a terminal in (NG)en-dc
  an indicator indicating that a frequency priority that is configured as a dedicated one is switchable to a frequency priority included in broadcasting signaling In operation 1h-15, the base station 1h-02 may transmit an RRC connection release message to the terminal 1h-01 to make the terminal 1h-01 which is in an RRC connected mode to transition into an RRC idle mode or an RRC inactive mode. In the RRC connection release message, a CRP with respect to a first RAT, CRP with respect to a second RAT, a T320 timer value, and alternativeCRPIndication (an indicator indicating to ignore a frequency priority that is configured by dedicated signaling (e.g., RRC connection release message) according to the capability of a terminal and system information of a base station but to apply frequency priority broadcast by broadcast signaling (e.g., system information)) may be included. For example, the above-described information may be included in an idleModeMobilityControlInfo information element that may be included in the RRC connection release message. The first RAT according to an embodiment of the disclosure may indicate EUTRA, and the second RAT according to an embodiment of the disclosure may indicate other RATs except for EUTRA (e.g., NR, URA-FDD, UTRA-TDD, CDMA2000). When the CRP with respect to the first RAT and/or the CRP with respect to the second RAT are included in the RRC connection release message, the terminal 1h-01 may store the CRPs. A CRP may indicate a priority value of each frequency in each RAT in the above-described embodiment of the disclosure. When the T320 timer value is included in the RRC connection release message, the T320 timer value may be configured as a value of a T320 timer so as to start the T320 timer. When the T320 timer is expired, the terminal 1h-01 may discard the frequency priority configuration information received and configured via the RRC connection release message.

In operation 1h-20, the terminal 1h-01 that has transitioned to an RRC idle mode or an RRC inactive mode may perform a cell selection process.

In operation 1h-25, the terminal 1h-01 may receive system information from a cell it has camped on through cell selection. In the system information, parameters for cell reselection may be included. For example, following parameters may be included:
  CRP information regarding the first RAT: SIB3 and SIB5
  A first CRP (legacy CRP) and a second CRP (CRP for EN-DC) of a serving frequency may be included in SIB3.
  A first CRP and a second CRP for each first RAT inter-frequency may be included in SIB5.
  CRP information regarding the second RAT: SIB6, SIB7, SIB8, SIB24
  A first CRP for each frequency of the second RAT. For example, in SIB6, a CRP for each UTRA frequency may be included, and in SIB24, a CRP for each NR frequency may be included.

For convenience of description, it will be described that two CRPs may be included per E-UTRAN frequency in system information, with respect to the first RAT, and with respect to the second RAT, one CRP may be included per frequency in the system information. That is, two or more CRPs may be included per E-UTRAN frequency in the system information, with respect to the first RAT, or multiple CRPs may be included per frequency in the system information with respect to the second RAT. The above description may obviously be applied below.

alternativeCRPRideIndication included in the RRC connection release message may also be used as an indicator indicating which CRP is to use for each frequency in each RAT.

In operation 1h-30, the terminal 1h-01 may perform a cell reselection evaluation process. The terminal 1h-01 may perform a cell reselection evaluation process on EUTRA frequencies and inter-RAT frequencies that are broadcast in the provided frequency priority configuration information and the provided system information (The UE shall only perform cell reselection evaluation for E-UTRAN frequencies and inter-RAT frequencies that are given in system information and for which the UE has a priority provided). The cell reselection evaluation process may indicate a series of following processes.

Reselection priorities handling
Measurement rules for cell reselection
Cell reselection criteria The reselection priorities handling may be applied differently in a first RAT and a second RAT based on the capability of the terminal 1h-01 that is in an RRC idle mode or an RRC inactive mode and whether the RRC connection release message received in operation 1h-15 includes alternativeCRPIndication.

When alternativeCRPIndication is included in the received RRC connection release message and is supported by the terminal 1h-01, and the terminal 1h-01 is an (NG)EN-DC capable terminal, and NR is enabled, or the terminal 1h-01 is an (NG)EN-DC capable terminal, and NR is enabled, and a frequency priority that is configured as a dedicated one is switchable to a frequency priority included in broadcast signaling, the terminal 1h-01 may determine frequency priority by applying the second CRP included in SIB3 to a current serving frequency or by applying the second CRP included in SIB5 to an E-UTRAN inter-frequency. That is, even when the CRP with respect to the first RAT is included in the RRC connection release message received in operation 1h-15, the terminal 1h-01 may apply the second CRP included in SIB3 or SIB5. This may be applied regardless of driving of the T320 timer. The reason why alternativeCRPIndication is included in the RRC connection release message is that even when the base station 1h-02 includes the frequency priority configuration information in the RRC connection release message by considering the capability of the terminal 1h-01, it is difficult to determine mobility of the terminal 1h-01 that is in an RRC idle mode or an RRC inactive mode. When the second CRP is not broadcast in SIB3 or SIB5, or when NR is disabled, or a frequency priority that is configured as a dedicated one is not switchable to a frequency priority included in broadcast signaling, while the T320 tinier is driven, the terminal 1h-01 may determine frequency priority by applying a CRP included in the RRC connection release message. That is, the terminal 1h-01 may ignore the CRP with respect to the first RAT included in the system information received in operation 1h-25.

The terminal 1h-01 may determine the frequency priority by applying the CRP with respect to the second RAT included in the RRC connection release message, with respect to the second RAT, while the T320 timer is driven. When the T320 timer is not driven or is expired, the terminal 1h-01 may determine frequency priority by applying the first CRP with respect to the second RAT included in the system information, to the second RAT.

The terminal 1h-01 may perform neighbor cell measurement based on the following measurement rules by applying frequency priority for certain reasons or to minimize battery consumption. This may be the same as in the above-described embodiment of the disclosure.

The terminal 1h-01 may apply different cell reselection evaluation criteria according to frequency priorities. This may be the same as in the above-described embodiment of the disclosure.

In operation 1h-35, the terminal 1h-01 in an RRC idle mode or an RRC inactive mode may reselect a new cell 1h-03 through operation 1h-30.

In operation 1h-40, the terminal 1h-01 may obtain system information including cell reselection parameters from the reselected cell 1h-03.

In operation 1h-45, when the second CRP with respect to the first RAT is included in the received system information, the terminal 1h-01 may perform operation 1h-30 described above to perform a cell reselection procedure. When the second CRP with respect to the first RAT is not included in the system information received in operation 1h-40, while the T320 timer is driven, the terminal 1h-01 may determine frequency priority based on the RRC connection release message received in operation 1h-15 and perform a cell reselection procedure. When the T320 timer is expired or does not run, the terminal 1h-01 may perform a cell reselection procedure by determining frequency priority based on the system information received in operation 1h-40.

In the embodiment of the disclosure, (NG)EN-DC is described as an example for convenience of description. However, the embodiments of the disclosure are not limitedly applied only to (NG)EN-DC but may also be applied to NE-DC and NR-DC based on the same principle.

Figure 1I:
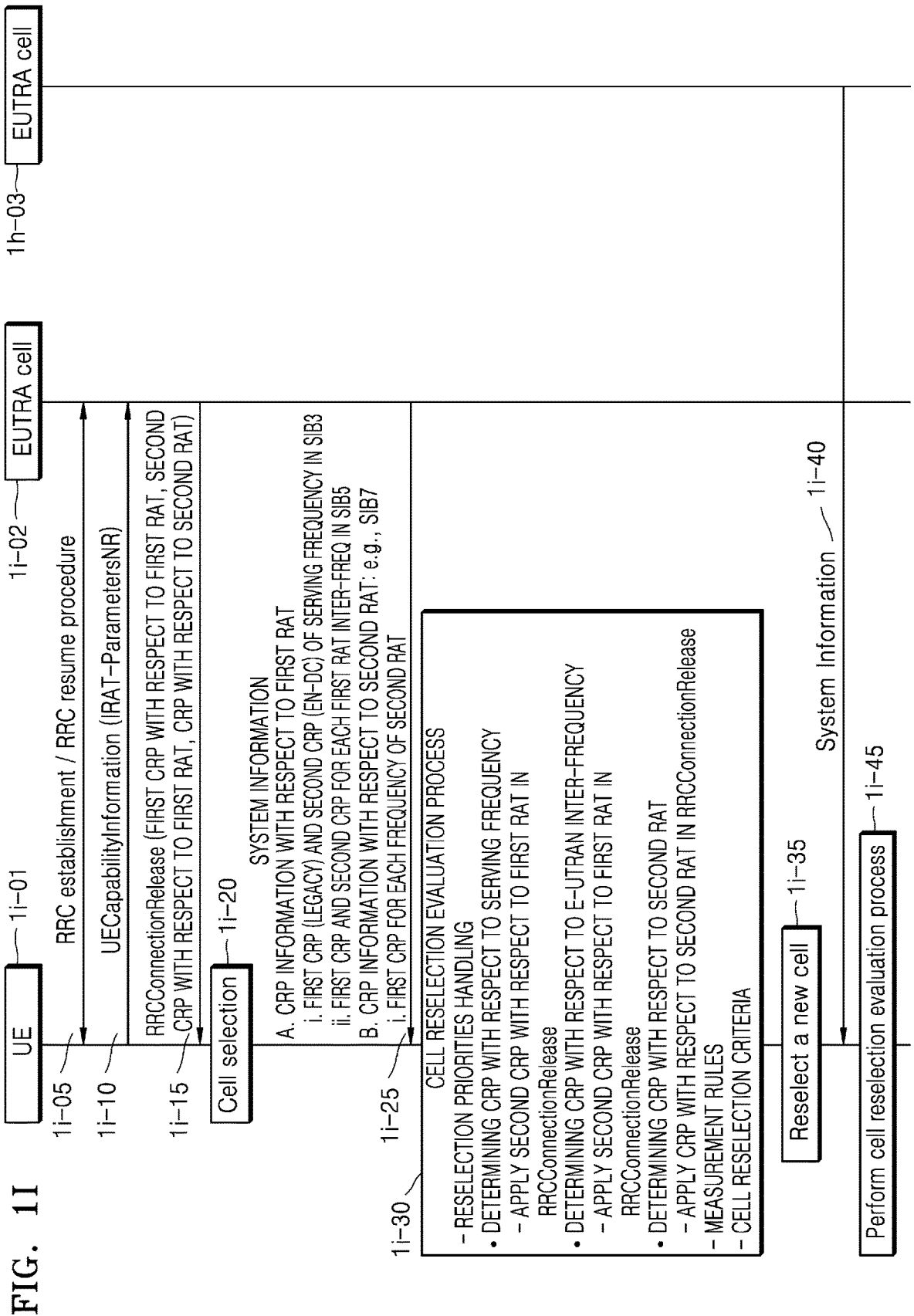
FIG. 1I is a diagram for describing a process of reselecting a cell, performed by a terminal that is in an RRC inactive mode RRC_INACTIVE or an RRC idle mode RRC_IDLE in a next-generation mobile communication system, according to an embodiment of the disclosure.

FIG. 1I is a diagram for describing a process of reselecting a cell, performed by a terminal that is in an RRC inactive mode RRC_INACTIVE or an RRC idle mode RRC_IDLE in a next-generation mobile communication system, according to an embodiment of the disclosure.

Referring to FIG. 1I, in operation 1I-05, a terminal 1i-01 may convert into an RRC connected mode RRC_CONNECTED through an RRC establishment process or an RRC resume process 1i-05 with a base station 1i-02.

In operation 1i-10, the terminal 1i-01 in an RRC connected mode may transmit UECapabilityInformation including an IRAT-ParametersNR information element to the base station 1i-02. At least one of the followings may be included in the IRAT-ParametersNR information element.

an indicator indicating whether en-DC is supported
an indicator indicating whether ng-en-dc is supported
an indicator indicating whether eventB2 is supported
NR band information that is supportable by a terminal in (NG)en-dc
an indicator indicating whether multiple CRPs are available per E-UTRAN frequency
an indicator indicating whether multiple CRPs are available per RAT frequency In operation 1i-15, the base station 1i-02 may transmit an RRC connection release message to the terminal 1i-01 to make the terminal 1i-01 which is in an RRC connected mode to transition into an RRC idle mode or an RRC inactive mode. In the RRC connection release message, a first CRP with respect to a first RAT, a second CRP with respect to the first RAT (priority for (NG)EN-DC), a CRP with respect to a second RAT, and a T320 timer value. For example, the above-described information may be included in an idleModeMobilityControlInfo information element that may be included in the RRC connection release message. The first RAT according to an embodiment of the disclosure may indicate EUTRA, and the second RAT according to an embodiment of the disclosure may indicate other RATs except for EUTRA (e.g., NR, UTRA-FDD, UTRA-TDD, CDMA2000).

For convenience of description, it will be described that in the RRC connection release message according to an embodiment of the disclosure, two CRPs may be included per E-UTRAN frequency with respect to the first RAT, and one CRP may be included per frequency with respect to the second RAT. That is, with respect to the first RAT, a plurality of CRPs may be included for each E-UTRAN frequency, or with respect to the second RAT, a plurality of CRPs may be included for each frequency. The above description may obviously be applied below. Also, in the RRC connection release message, indicators indicating which CRP is to be applied from among a plurality of CRPs may also be included.

When the first CRP with respect to the first RAT and/or the second CRP with respect to the first RAT and/or the CRP with respect to the second RAT are included in the RRC connection release message, the terminal 1i-01 may store the first CRP and/or the second CRP and/or the CRP. A CRP may indicate a priority value of each frequency in each RAT in the above-described embodiment of the disclosure. When the T320 timer value is included in the RRC connection release message, the T320 timer value may be configured as a value of a T320 tinier so as to run the T320 timer. When the T320 timer is expired, the terminal 1i-01 may discard the frequency priority configuration information received and configured via the RRC connection release message.

In operation 1i-20, the terminal 1i-01 that has transitioned to an RRC idle mode or an RRC inactive mode may perform a cell selection process.

In operation 1i-25, the terminal 1i-01 may receive system information from a cell it has camped on through cell selection. In the system information, parameters for cell reselection may be included. For example, following parameters may be included:

CRP information regarding the first RAT: SIB3 and SIB5
A first CRP (legacy CRP) and a second CRP (CRP for EN-DC) of a serving frequency may be included in SIB3.
A first CRP and a second CRP for each first RAT inter-frequency may be included in SIB5
CRP information regarding the second RAT: SIB6, SIB7, SIB8, SIB24
A first CRP for each frequency of the second RAT. For example, in SIB6, a CRP for each UTRA frequency may be included, and in SIB24, a CRP for each NR frequency may be included.

For convenience of description, it will be described that two CRPs may be included per E-UTRAN frequency in system information, with respect to the first RAT, and with respect to the second RAT, one CRP may be included per frequency in the system information. That is, two or more CRPs may be included per E-UTRAN frequency in the system information, with respect to the first RAT, or with respect to the second RAT, multiple CRPs may be included per frequency in the system information. The above description may obviously be applied below. In addition, when the RRC connection release message includes an indicator indicating which of the plurality of CRPs is to be applied, the terminal 1i-01 may apply the indicator to select one of the plurality of CRPs in the system information.

In operation the terminal 1i-01 may perform a cell reselection evaluation process. The terminal 1i-01 may perform a cell reselection evaluation process on EUTRA frequencies and inter-RAT frequencies that are provided in the provided frequency priority configuration information and the provided system information (The UE shall only perform cell reselection evaluation for E-UTRAN frequencies and inter-RAT frequencies that are given in system information and for which the UE, has a priority provided). The cell reselection evaluation process may indicate a series of following processes.

Reselection priorities handling
Measurement rules for cell reselection
Cell reselection criteria The reselection priorities handling may be determined based on the capability of the terminal 1i-01 that is in an RRC idle mode or an RRC inactive mode, frequency priority configuration information with respect to the first RAT and frequency priority configuration information with respect to the second RAT included in the RRC connection release message received in operation 1i-15.

While the T320 timer is driven, and the terminal 1i-01 is an (NG)EN_DC capable terminal, and NR is enabled, or the terminal 1i-01 is an (NG)EN-DC capable terminal, and NR is enabled, and two CRPs are available per E-UTRAN frequency (that is, when a terminal is able to select and apply one of the two CRPs per E-UTRAN frequency included in the RRC connection release message), the terminal 1i-01 may determine frequency priority by applying the second CRP with respect to the first RAT included in the RRC connection release message received in operation 1i-15, to a current serving frequency and an E-UTRAN inter-frequency.

While the T320 timer is driven, when NR is disabled or when it is impossible to select and apply one of the two CRPs per E-UTRAN frequency included in the RRC connection release message, the terminal 1i-01 may determine frequency priority by applying the first CRP with respect to the first RAT included in the RRC connection release message received in operation 1i-15, to a current serving frequency and an E-UTRAN inter-frequency.

While the T320 timer is driven, the terminal 1i-01 may apply frequency priority configuration information by applying the CRP with respect to the second RAT included in the RRC connection release message received in operation 1i-15, to the second RAT.

When the T320 timer does not run or is expired, the terminal 1i-01 may apply the frequency priority configuration information included in the system information. Here, when the terminal 1i-01 is an (NG)EN_DC capable terminal, and NR is enabled, or the terminal 1i-01 is an (NG)EN_DC capable terminal, and NR is enabled, and the second CRP in SIB3/SIB5 is applicable, the terminal 1i-01 may apply frequency priority configuration information by applying the second CRP included in SIB3 received in operation 1i-25, to a current serving frequency, and apply frequency priority configuration information by applying the second CRP included in SIB5 received in 1i-25, to an E-UTRAN inter-frequency. The terminal 1i-01 may apply frequency priority configuration information by applying the first CRP included in the system information received in operation 1i-25, to the second RAT.

The terminal 1i-01 may perform neighbor cell measurement based on the following measurement rules by applying frequency priority for certain reasons or to minimize battery consumption. This may be the same as in the above-described embodiment of the disclosure.

The terminal 1i-01 may apply different cell reselection evaluation criteria according to frequency priorities. This may be the same as in the above-described embodiment of the disclosure.

In operation 1i-35, the terminal 1i-01 in an RRC idle mode or an RRC inactive mode may reselect a new cell 1i-03 through operation 1i-30.

In operation 1i-40, the terminal 1i-01 may obtain system information including cell reselection parameters from the reselected cell 1i-03.

In operation 1i-45, when the second. CRP with respect to the first RAT is included in the received system information, the terminal may perform operation 1i-30 described above to perform a cell reselection procedure. When the second GRP with respect to the first RAT is not included in the system information received in operation 1i-40, while the T320 timer is driven, the terminal 1i-01 may determine frequency priority by applying the first CRP for each frequency of each RAT included in the RRC connection release message received in operation 1i-15 and perform a cell reselection procedure. When the second CRP with respect to the first RAT is not included in the system information received in operation 1i-40, and the T320 timer does not run or is expired, the terminal 1i-01 may determine frequency priority by applying the first CRP for each frequency of each RAT included in the system information received in operation 1i-40 and perform a cell reselection procedure.

In the embodiment of the disclosure, (NG)EN-DC is described as an example for convenience of description. However, the embodiments of the disclosure are not limitedly applied only to (NG)EN-DC; but may also be applied to NE-DC or NR-DC based on the same principle.

FIG. 1J is a diagram for describing a process of reselecting a cell, performed by a terminal that is in an RRC inactive mode RRC_INACTIVE or an RRC idle mode RRC_IDLE in a next-generation mobile communication system, according to an embodiment of the disclosure.

Referring to FIG. 1J, in operation 1j-05, a terminal 1j-01 may convert into an RRC connected mode RRC_CONNECTED through an RRC establishment process or an RRC resume process 1j-05 with a base station 1j-02.

In operation 1j-10, the terminal 1j-01 in an RRC connected mode may transmit UECapabilityInformation including IRAT-ParametersNR information element to the base station 1j-02. At least one of the followings may be included in the IRAT-ParametersNR information element.
- an indicator indicating whether en-DC is supported
- an indicator indicating whether ng-en-dc is supported
- an indicator indicating whether eventB2 is supported
- NR band information that is supportable by a terminal in (NG)en-dc
- an indicator indicating whether multiple CRPs are available per E-UTRAN frequency
- an indicator indicating whether driving of multiple timers per E-UTRAN frequency is supported
- an indicator indicating whether multiple CRPs are available per RAT frequency
- an indicator indicating whether driving of multiple timers per frequency for each RAT is supported In operation 1j-15, the base station 1j-02 may transmit an RRC connection release message to the terminal 1j-01 to make the terminal 1j-01 which is in an RRC connected mode to transition into an RRC idle mode or an RRC inactive mode. In the RRC connection release message, a first CRP with respect to a first RAT, a second CRP with respect to the first RAT (priority for (NG)EN-DC), a CRP with respect to a second RAT, a T320 timer value, and a value of a new timer (e.g., Txxx) that is applicable to the second CRP with respect to the first RAT may be included. For example, the above-described information may be included in an idleModeMobillityControlInfo information element that may be included in the RRC connection release message. The first RAT according to an embodiment of the disclosure may indicate EUTRA, and the second RAT according to an embodiment of the disclosure may indicate other RATs except for EUTRA (e.g., NR, UTRA-FDD, UTRA-TDD, CDMA2000). In the RRC connection release message according to the embodiment of the disclosure, two CRPs may be included per E-UTRAN frequency with respect to the first RAT, and with respect to the second. RAT, one CRP may be included per frequency, and two timer values may be included with respect to an E-UTRAN frequency. When the first CRP with respect to the first RAT and/or the second CRP with respect to the first RAT and/or the CRP with respect to the second RAT are included in the RRC connection release message, the terminal 1j-01 may store the first CRP and/or the second CRP and/or the CRP. A CRP may indicate a priority value of each frequency for each RAT in the above-described embodiment of the disclosure. When the T320 timer value is included in the RRC connection release message, the terminal 1j-01 may set the T320 timer value as a value of a T320 timer so as to run the T320 timer. The T320 timer may be applied to the first CRP with respect to the first RAT and the first CRP with respect to the second RAT. When the T320 timer is expired, the terminal 1j-01 may discard the first CRP with respect to the first RAT and the first CRP with respect to the second RAT, which are configured via the RRC connection release message. That is, the T320 timer may be applied to the first CRP with respect to the first RAT and the first CRP with respect to the second RAT. When a value of a new timer (e.g., Txxx) is included in the RRC connection release message, the terminal may start a Txxx timer by configuration the Txxx time value. The Txxx timer may be applied to the second CRP with respect to the first RAT. When the Txxx timer is expired, the terminal 1j-01 may discard the second CRP with respect to the first RAT, which is configured via the RRC connection release message. That is, the Txxx timer may be applied to the second CRP with respect to the first RAT.

In operation 1j-20, the terminal 1j-01 that has transitioned to an RRC idle mode or an RRC inactive mode may perform a cell selection process.

In operation 1j-25, the terminal 1j-01 may receive system information from a cell it has camped on through cell selection. In the system information, parameters for cell reselection may be included. For example, following parameters may be included:
- CRP information regarding the first RAT: SIB3 and SIB5
- A first CRP (legacy CRP) and a second CRP (CRP for EN-DC) of a serving frequency may be included in SIB3.
- A first CRP and a second CRP for each first RAT inter-frequency may be included in SIB5.
- CRP information regarding the second RAT: SIB6, SIB7, SIB8, SIB24
- A first CRP for each frequency of the second RAT. For example, in SIB6, a CRP for each UTRA frequency may be included, and in SIB24, a CRP for each NR frequency may be included.

For convenience of description, it will be described that in system information according to an embodiment of the disclosure, two CRPs may be included per E-UTRAN frequency with respect to the first RAT, and with respect to the second RAT, one CRP may be included per frequency.

In operation 1j-30, the terminal 1j-01 may perform a cell reselection evaluation process. The terminal 1j-01 may perform a cell reselection evaluation process on EUTRA frequencies and inter-RAT frequencies that are broadcast in the provided frequency priority configuration information and the provided system information (The UE shall only perform cell reselection evaluation for E-UTRAN frequencies and inter-RAT frequencies that are given in system information and for which the UE has a priority provided). The cell reselection evaluation process may indicate a series of following processes.

Reselection priorities handling
Measurement rules for cell reselection
Cell reselection criteria The reselection priorities handling may be determined based on the capability of the terminal 1j-01 that is in an RRC idle mode or an RRC inactive mode, frequency priority configuration information with respect to the first RAT, and frequency priority configuration information with respect to the second RAT included in the RRC connection release message received in operation 1j-15, a T320 timer value, and a Txxx timer value.

While the Txxx timer is driven, and the terminal 1j-01 is an (NG)EN DC capable terminal, and NR is enabled, or the terminal 1j-01 is an (NG)EN-DC capable terminal, and NR is enabled, and two CRPs are available per E-UTRAN frequency (that is, when a terminal is able to select and apply one of the two CRPs per frequency), the terminal 1j-01 may apply frequency priority configuration information by applying the second CRP with respect to the first RAT included in the RRC connection release message received in operation 1j-15, to a current serving frequency and an E-UTRAN inter-frequency. The above operation may be performed regardless of driving of the T320 timer.

When the Txxx timer does not run or is expired, and the terminal 1j-01 is an (NG)EN_DC capable terminal, and NR is enabled, or the terminal 1j-01 is an (NG)EN-DC capable terminal, and NR is enabled and the second CRP in SIB3/SIB5 is applicable, the terminal 1j-01 may apply frequency priority configuration information by applying the second CRP included in SIB3 received in operation 1j-25, to a current serving frequency, and apply frequency priority configuration information by applying the second CRP included in SIB5 received in operation 1j-25, to an E-UTRAN inter-frequency. The above operation may be performed regardless of driving of the T320 timer.

While the T320 timer is driven, and NR is disabled, or the terminal 1j-01 is not able to select and apply one of the two CRPs per E-UTRAN frequency, the terminal 1j-01 may apply frequency priority configuration information by applying the first CRP with respect to the first RAT included in the RRC connection release message received in operation 1j-15, to a current serving frequency and an E-UTRAN inter-frequency.

While the T320 timer is driven, the terminal 1j-01 may apply frequency priority configuration information by applying the CRP with respect to the second RAT included in the RRC connection release message received in operation 1j-15, to the second RAT.

When the T320 timer does not run or is expired, the terminal 1j-01 may apply the frequency priority configuration information included in the system formation, to the second RAT. Here, when NR is disabled or the terminal 1j-01 is not able to select and apply one of the two CRPs per E-UTRAN frequency, the terminal 1j-01 may apply frequency priority configuration information by applying the first CRP included in SIB3 received in operation 1j-25, to a current serving frequency, and may apply frequency priority configuration information by applying the first CRP included in SIB5 received in operation 1j-25, to an E-UTRAN inter-frequency. The terminal 1j-01 may apply frequency priority configuration information by applying the first CRP included in the system information received in operation 1j-25, to the first RAT.

The terminal 1j-01 may perform neighbor cell measurement based on the following measurement rules by applying frequency priority for certain reasons or to minimize battery consumption. This may be the same as in the above-described embodiment of the disclosure.

The terminal 1j-01 may apply different cell reselection evaluation criteria according to frequency priorities. This may be the same as in the above-described embodiment of the disclosure.

In operation 1j-35, the terminal 1j-01 in an RRC idle mode or an RRC inactive mode may reselect a new cell 1j-03 through operation 1j-30.

In operation 1j-40, the terminal 1j-01 ray obtain system information including cell reselection parameters from the reselected cell 1j-03.

In operation 1j-45, when the second CRP with respect to the first RAT is included in the received system information, the terminal 1j-01 may perform operation 1j-30 described above to perform a cell reselection procedure. When the second CRP with respect to the first RAT is not included in the system information received in operation 1j-40, while the T320 timer is driven, the terminal 1j-01 may apply frequency priority configuration information by applying the first CRP for each frequency of each RAT included in the RRC connection release message received in operation 1j-15 and perform a cell reselection procedure. Here, the terminal 1j-01 may perform at least one of operations below.

when driving the Txxx timer, continuously driving the Txxx timer.
stopping the Txxx timer and deleting the second CRP with respect to the first RAT, included in the RRC connection release message
stopping the Txxx timer; and when the second CRP is included in SIB3 or SIB5 broadcast by a cell that is later newly selected, restarting the Txxx timer When the second CRP with respect to the first RAT is not included in the system information received in operation 1j-40, and the T320 timer does not run or is expired, the terminal 1j-01 may determine frequency priority by applying the first CRP for each frequency of each RAT included in the system information received in operation 1j-40 and perform a cell reselection procedure.

In the embodiment of the disclosure, (NG)EN-DC is described as an example for convenience of description. However, the embodiments of the disclosure are not limitedly applied only to (NG)EN-DC but may also be applied to NE-DC or NR-DC based on the same principle.

Figure 1K:
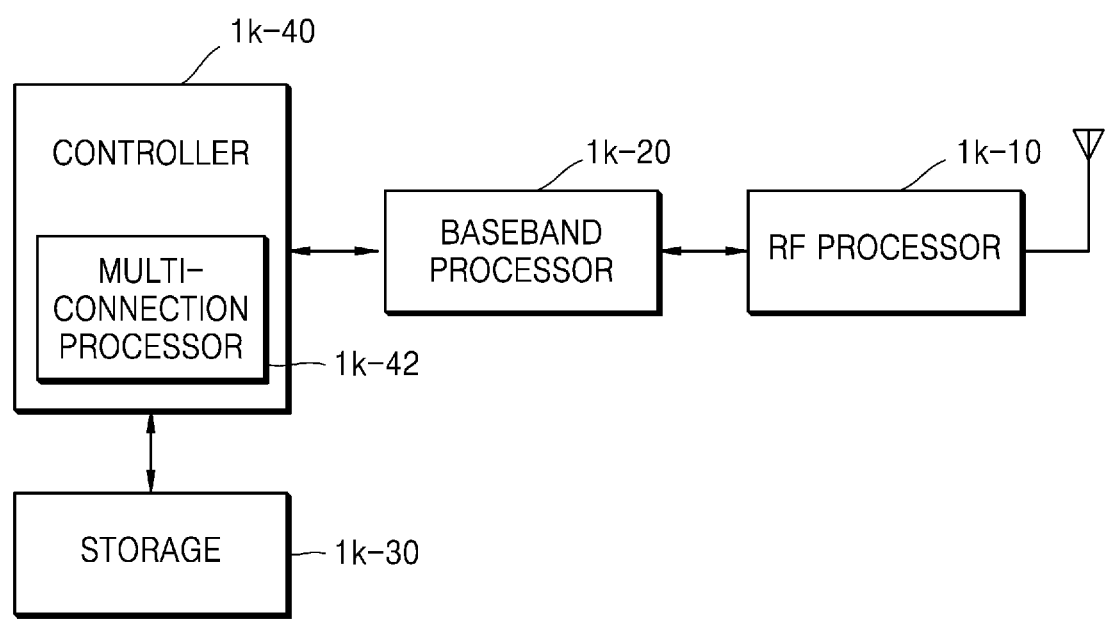
FIG. 1K is a block diagram illustrating an internal structure of a terminal according to an embodiment of the disclosure.

FIG. 1K is a block diagram illustrating an internal structure of a terminal according to an embodiment of the disclosure.

Referring to FIG. 1K, the terminal may include a radio frequency (RF) processor 1k-10, a baseband processor 1k-20, a storage 1k-30, and a controller 1k-40.

The RF processor 1k-10 performs a function of transmitting or receiving a signal via a wireless channel, such as signal band conversion, amplification, or the like. That is, the RF processor 1*k*-10 may up-convert a baseband signal provided from the baseband processor 1*k*-20, into an RF band signal and transmit the same via an antenna, and down-convert an RF band signal received via an antenna into a baseband signal. For example, the RF processor 1*k*-10 may include a transmission filter, a reception filter, an amplifier, a mixer, an oscillator, a digital to analog convertor (DAC), an analog to digital convertor (ADC), or the like. In FIG. 1K, while only one antenna is illustrated, the terminal may include multiple antennas. Also, the RF processor 1*k*-10 may include multiple RF chains. Further, the RF processor 1*k*-10 may perform beamforming. For beamforming, the RF processor 1*k*-10 may adjust a phase and size of each signal transmitted or received via multiple antennas or antenna elements. Also, The RF processor 1*k*-10 may perform multiple-input multiple-output (MIMO) and may receive several layers when performing a MIMO operation.

The baseband processor 1*k*-20 performs a conversion function between a baseband signal and a bit string according to the physical layer specifications of a system. For example, during data transmission, the baseband processor 1*k*-20 may encode and modulate a transmission bit string to generate complex symbols. Also, during data reception, the baseband processor 1*k*-20 may restore a reception bit string by demodulating and decoding a baseband signal provided by the RF processor 1*k*-10. For example, when using the OFDM method, during data transmission, the baseband processor 1*k*-20 may generate complex symbols by encoding and modulating a transmission bit string, and map the complex symbols to sub-carriers, and then constitute OFDM symbols through inverse fast Fourier transform (IFFT) operation and cyclic prefix (CP) insertion. Also, during data reception, the baseband processor 1*k*-20 may divide a baseband signal provided by the RF processor 1*k*-10, into units of OFDM symbols, and restore signals mapped to subcarriers, through fast Fourier transform (FFT), and restore a reception bit string through demodulation and decoding.

The baseband processor 1*k*-20 and the RIF processor 1*k*-10 transmit and receive a signal as described above. Accordingly, the baseband processor 1*k*-20 and the RF processor 1*k*-10 may be referred to as a transmitter, a receiver, a transceiver, or a communicator. Further, at least one of the baseband processor 1*k*-20 or the RF processor 1*k*-10 may include multiple communication modules to support different multiple RATs. In addition, at least one of the baseband processor 1*k*-20 or the RF processor 1*k*-10 may include different communication modules from each other, to process signals of different frequency bands from each other. For example, the different radio access techniques may include a wireless local area network (LAN) (e.g., IEEE 802.11), a cellular network (e.g., LTE), or the like. Also, the different frequency bands may include super high frequency (SHF) bands (e.g., 2. NRHz, NRhz), millimeter (mm) wave (e.g., 60 GHz) bands.

The storage 1*k*-30 may store data such as a basic program for an operation of a terminal, an application program, configuration information, or the like. In particular, the storage 1*k*-30 may store information related to a second access node performing wireless communication by using a second RAT. Also, the storage 1*k*-30 provides stored data according to a request from the controller 1*k*-40.

The controller 1*k*-40 controls the overall operations of the terminal. For example, the controller 1*k*-40 may control the terminal such that the terminal receives information needed to reselect a cell, and may control components of the terminal such that they determine a CRP with respect to each RAT based on the received information and perform procedures for reselecting cell. For example, the controller 1*k*-40 transmits or receives a signal via the baseband processor 1*k*-20 and the RF processor 1*k*-10. Also, the controller 1*k*-40 records and reads data to and from the storage 1*k*-40. To this end, the controller 1*k*-40 may include at least one processor. For example, the controller 1*k*-40 may include a communicator processor (CP) performing control for communication and an application processor (AP) controlling upper layers such as an application program.

Figure 1L:
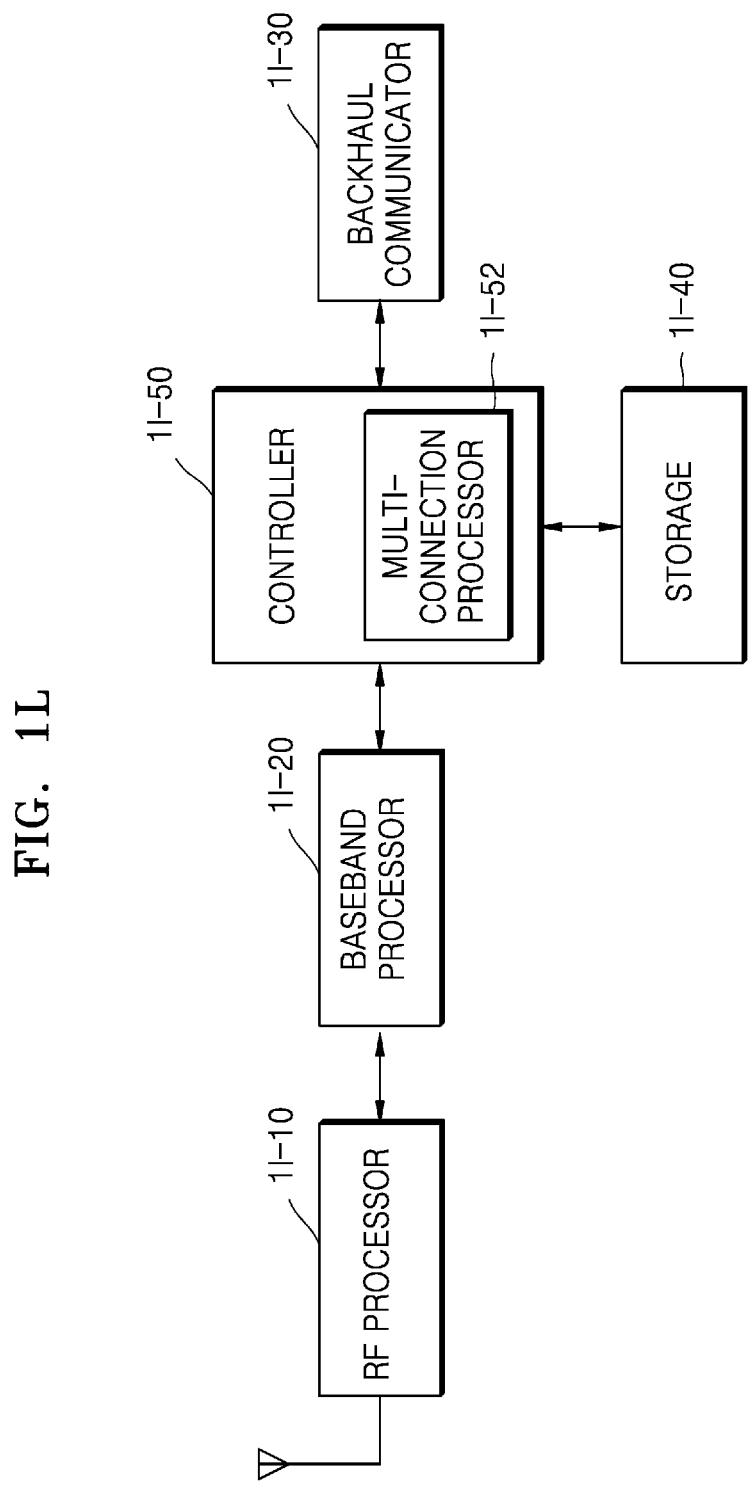
FIG. 1L is a block diagram illustrating a configuration of a New Radio (NR) base station according to an embodiment of the disclosure.

FIG. 1L is a block diagram illustrating a configuration of an NR base station according to an embodiment of the disclosure.

As illustrated in FIG. 1L, the NR base station includes an RF processor 1L-10, a baseband processor 1L-20, a backhaul communicator 1L-30, a storage 1L-40, and a controller 1L-50.

The RF processor 1L-10 performs a function of transmitting or receiving a signal via a wireless channel, such as signal band conversion, amplification, or the like. That is, the RF processor 1L-10 may up-convert a baseband signal provided from the baseband processor 1L-20, into an RF band signal and transmit the same via an antenna, and down-convert an RF band signal received via an antenna into a baseband signal. For example, the RF processor 1L-10 may include a transmission filter, a reception filter, an amplifier, a mixer, an oscillator, a DAC, an ADC, or the like. In FIG. 1L, while only one antenna is illustrated, a first access node may include multiple antennas. Also, the RF processor 1L-10 may include multiple RF chains. Further, the RF processor 1L-10 may perform beamforming. For beamforming, the RF processor 1L-10 may adjust a phase and size of each signal transmitted or received via multiple antennas or antenna elements. The RF processor 1L-10 may perform a downward MIMO operation by transmitting at least one layer.

The baseband processor 1L-20 performs a conversion function between a baseband signal and a bit string according to the physical layer standards of a first RAT. For example, during data transmission, the baseband processor 1L-20 may encode and modulate a transmission bit suing to generate complex symbols. Also, during data reception, the baseband processor 1L-20 may restore a reception bit string by demodulating and decoding a baseband signal provided by the RF processor 1L-10. For example, when using the OFDM method, for data transmission, the baseband processor 1L-20 may generate complex symbols by encoding and modulating a transmission bit string, and map the complex symbols to subcarriers, and then constitute OFDM symbols through IFFT operation and CP insertion. Also, for data reception, the baseband processor 1L-20 may divide a baseband signal provided by the RF processor 1*k*-10, into units of OFDM symbols, and restore signals mapped to subcarriers, through FFT operation, and restore a received bit string by demodulating and decoding the signals. The baseband processor 1L-20 and the RF processor 1L-10 transmit and receive a signal as described above. Accordingly, the baseband processor 1L-20 and the RF processor 1L-10 may be referred to as a transmitter, a receiver, a transceiver, a communicator, or a wireless communicator.

The backhaul communicator 1L-30 provides an interface to perform communication with other nodes in a network. That is, the backhaul communicator 1L-30 converts a bit string transmitted from a main base station to another node such as a sub-base station, a core network, or the like, into a physical signal, and converts a physical signal received from the other node into a bit string.

The storage 1L-40 may store data such as a basic program for an operation of the main base station, an application program, configuration information, or the like. In particular, the storage 1L-40 may store information about a bearer allocated to a connected terminal, a measurement result reported by the connected terminal, or the like. Also, the storage 1L-40 may provide multiple connections to a terminal or store information that serves as criteria for determining whether to stop the connections. Also, the storage 1L-40 provides stored data according to a request from the controller 1L-50.

The controller 1L-50 may control the overall operations of the main base station. For example, a base station according to an embodiment of the disclosure may control the terminal to perform the above-described procedures to provide information for cell reselection by the terminal. For example, the controller 1L-50 transmits or receives a signal via the baseband processor 1L-20 and the RF processor 1L-10 or via the backhaul communicator 1L-30. Also, the controller 1L-50 may record and read data to and from the storage 1L-40. To this end, the controller 1L-50 may include at least one processor.

The methods according to the embodiments of the disclosure described in the claims or specification of the disclosure may be implemented in the form of hardware, software, or a combination of hardware and software.

When implemented as software, a computer-readable storage medium storing one or more programs (e.g., software modules) may be provided. The one or more programs stored in the computer-readable storage medium are configured for execution by one or more processors in an electronic device. The one or more programs include instructions directing the electronic device to execute the methods according to embodiments of the disclosure as described in the specification or in the following claims.

The programs (e.g, software modules or software) may be stored in a random access memory (RAM), a non-volatile memory including a flash memory, a read-only memory (ROM), an electrically erasable programmable read-only memory (EEPROM), a magnetic disc storage device, a compact disc-ROM (CD-ROM), a digital versatile disc (DVD), other types of optical storage device, or a magnetic cassette. Alternatively, the programs may be stored in a memory system including a combination of some or all of the above-mentioned memory devices. In addition, each memory device may be included by a plural number.

The programs may also be stored in an attachable storage device which is accessible through a communication network such as the Internet, an intranet, a local area network (LAN), a wide LAN (WLAN), or a storage area network (SAN), or a combination thereof. The storage device may be connected through an external port to an apparatus performing the embodiments of the disclosure. Another storage device on the communication network may also be connected to the apparatus performing the embodiments of the disclosure.

In the disclosure, the term "computer program product" or "computer readable medium" is used to refer to a medium such as a memory, a hard disk installed in a hard disk drive, a signal, or the like, as a whole. When unicast vehicle communication according to the disclosure is performed, these "computer program products" or "computer-readable recording media" are a means provided to a method of performing, by a receiving terminal, L3 filtering and a method of transmitting, by the receiving terminal to a transmission terminal, a measurement result of the L3 filtering.

According to the embodiment of the disclosure, an apparatus and method for effectively providing services in a wireless communication system are provided.

In the afore-described embodiments of the disclosure, elements included in the disclosure are expressed in a singular or plural form according to the embodiments of the disclosure. However, the singular or plural form is appropriately selected for convenience of explanation, and the disclosure is not limited thereto. As such, an element expressed in a plural form may also be configured as a single element, and an element expressed in a singular form may also be configured as plural elements.

Although the present disclosure has been described with various embodiments, various changes and modifications may be suggested to one skilled in the art. It is intended that the present disclosure encompass such changes and modifications as fall within the scope of the appended claims.

What is claimed is:

1. A method, performed by a terminal in a wireless communication system, the method comprising:
transmitting, to a first cell, capability information of the terminal comprising information on whether the terminal supports a plurality of cell reselection priorities (CRPs);
receiving, from the first cell, a radio resource control (RRC) connection release message comprising an alternativeCRPindication parameter indicating to apply CRP broadcast in system information, based on the capability information of the terminal;
transitioning to an RRC idle mode or an RRC inactive mode based on the RRC connection release message, and camping on a second cell;
receiving, from the second cell, system information including a first CRP and/or a second CRP; and
based on the alternativeCRPindication parameter and the system information, applying the second CRP for evolved universal mobile telecommunications system (UMTS) terrestrial radio access network (EUTRAN) frequency if available, otherwise applying the first CRP.

2. The method of claim 1, further comprising in case that the RRC connection release message comprises a value of a timer, starting the timer based on the value of the timer.

3. The method of claim 1, wherein the system information is included in system information block (SIB)3 or SIB5.

4. The method of claim 3, wherein the SIB3 comprises information on the second CRP for a serving frequency associated with the second cell.

5. The method of claim 3, wherein the SIB5 comprises information on the second CRP per EUTRAN frequency.

6. A terminal in a wireless communication system, the terminal comprising:
a transceiver; and
at least one processor connected to the transceiver and configured to:
transmit, to a first cell, capability information of the terminal comprising information on whether the terminal supports a plurality of cell reselection priorities (CRPs),
receive, from the first cell, a radio resource control (RRC) connection release message comprising an alternativeCRPindication parameter indicating to apply CRP broadcast in system information, based on the capability information of the terminal,
transition to an RRC idle mode or an RRC inactive mode based on the RRC Connection Release message, and camp on a second cell, receive, from the second cell, system information including a first CRP and/or a second CRP, and based on the alternativeCRPindication parameter and the system information, apply the second CRP for evolved universal mobile telecommunications system (UMTS) terrestrial radio access network (EUTRAN) frequency if available, otherwise apply the first CRP.

7. The terminal of claim 6, wherein the at least one processor is further configured to start a timer in case that the RRC connection release message comprises a value of a timer.

8. The terminal of claim 6, wherein the system information is included in system information block (SIB)3 or SIB5.

9. The terminal of claim 8, wherein the SIB3 comprises information on the second CRP for a serving frequency associated with the second cell.

10. The terminal of claim 8, wherein the SIB5 comprises information on the second CRP per EUTRAN frequency.

11. A method, performed by a base station associated with a first cell in a wireless communication system, the method comprising:

receiving, from a terminal, capability information of the terminal comprising information on whether the terminal supports a plurality of cell reselection priorities (CRPs); and transmitting, to the terminal, a radio resource control (RRC) connection release message comprising an alternativeCRPindication parameter indicating to apply CRP broadcast in system information, based on the capability information of the terminal, wherein the terminal transitions to an RRC idle mode or an RRC inactive mode based on the RRC connection release message, camps on a second cell, receives, from the second cell, system information, and based on the alternativeCRPindication parameter and the system information including a first CRP and/or a second CRP, applies the second CRP for evolved universal mobile telecommunications system (UMTS) terrestrial radio access network (EUTRAN) frequency if available, otherwise applies the first CRP.

12. The method of claim 11, wherein in case that the RRC connection release message comprises a value of a timer, the terminal starts the timer based on the value of the timer.

13. The method of claim 11, wherein the system information is included in system information block (SIB)3 or SIB5.

14. The method of claim 13, wherein the SIB3 comprises information on the second CRP for a serving frequency associated with the second cell.

15. The method of claim 13, wherein the SIB5 comprises information on the second CRP per EUTRAN frequency.

16. A base station associated with a first cell in a wireless communication system, the base station comprising a transceiver; and at least one processor connected to the transceiver and configured to:

receive, from a terminal, capability information of the terminal comprising information on whether the terminal supports a plurality of cell reselection priorities (CRPs), and transmit, to the terminal, a radio resource control (RRC) connection release message comprising an alternativeCRPindication parameter indicating to apply CRP broadcast in system information, based on the capability information of the terminal, wherein the terminal is transitioned to an RRC idle mode or an RRC inactive mode based on the RRC connection release message, camps on a second cell, receives, from the second cell, system information, and based on the alternativeCRPindication parameter and the system information including a first CRP and/or a second CRP, applies the second CRP for evolved universal mobile telecommunications system (UMTS) terrestrial radio access network (EUTRAN) frequency if available, otherwise applies the first CRP.

17. The base station of claim 16, wherein in case that the RRC connection release message comprises a value of a timer, the terminal starts the timer based on the value of the timer.

18. The base station of claim 16, wherein the system information is included in system information block (SIB)3 or SIB5.

19. The base station of claim 18, wherein the SIB3 comprises information on the second CRP for a serving frequency associated with the second cell.

20. The base station of claim 18, wherein the SIB5 comprises information on the second CRP per EUTRAN frequency.

* * * * *